(12) United States Patent
Yegnanarayanan et al.

(10) Patent No.: US 11,016,360 B1
(45) Date of Patent: May 25, 2021

(54) OPTICAL MODULATOR RF ELECTRODES

(71) Applicant: Massachusetts Institute of Technology, Cambridge, MA (US)

(72) Inventors: Siva Yegnanarayanan, Lexington, MA (US); Wayne Woods, Burlington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 16/812,489

(22) Filed: Mar. 9, 2020

Related U.S. Application Data

(60) Provisional application No. 62/844,185, filed on May 7, 2019.

(51) Int. Cl.
  *G02F 1/225* (2006.01)
  *G02B 6/14* (2006.01)

(52) U.S. Cl.
  CPC ............. *G02F 1/2255* (2013.01); *G02B 6/14* (2013.01); *G02F 1/2257* (2013.01)

(58) Field of Classification Search
  CPC ......... G02F 1/0018; G02F 1/035; G02F 1/065
  USPC ............................................................ 385/2
  See application file for complete search history.

(56) References Cited

U.S. PATENT DOCUMENTS

| | | | |
|---|---|---|---|
| 4,448,479 A | 5/1984 | Alferness | |
| 5,189,547 A | 2/1993 | Day et al. | |
| 6,172,791 B1 | 1/2001 | Gill et al. | |
| 6,310,700 B1 | 10/2001 | Betts | |
| 6,741,762 B2 | 5/2004 | Grinberg et al. | |
| 6,763,151 B1 | 7/2004 | Bosso et al. | |
| 6,873,750 B2 | 3/2005 | Hum et al. | |
| 6,909,817 B2 | 6/2005 | Bosso et al. | |
| 6,928,223 B2 | 8/2005 | Walpole et al. | |
| 7,256,920 B2 | 8/2007 | Tinoco | |

(Continued)

OTHER PUBLICATIONS

Bertazzi, F. et al., "A novel coupled physics-based electromagnetic model of semiconductor traveling-wave structures for RF and optoelectronic applications," 11th GaAs Symposium Tech. Digest, Munich, pp. 239-242 (2003).

(Continued)

*Primary Examiner* — Jerry M Blevins
(74) *Attorney, Agent, or Firm* — Smith Baluch LLP

(57) ABSTRACT

The performance of an electro-optic modulator depends in part on the capacitance, the inductance, the electric field distribution, and the signal insertion loss of a microwave transmission line that modulates the refractive index of a waveguide via the electro-optic effect. Conventional electro-optic modulators are typically unable to improve one of these properties without negatively affecting other properties, resulting in lower performance. These shortcomings may be overcome, in part, by the inclusion of capacitive structures to decouple these properties. The capacitive structure may include a fang and/or a hook to tune the capacitance and the electric field distribution without appreciably changing the inductance or the signal insertion losses. The inductance and the signal insertion losses may be tuned by changing the sizes and shapes of a signal conductor, a ground conductor, and a slot formed between the signal and ground conductors without appreciably changing the capacitance or the electric field distribution.

18 Claims, 23 Drawing Sheets

(56) References Cited

U.S. PATENT DOCUMENTS

| | | | |
|---|---|---|---|
| 8,135,243 | B2 | 3/2012 | Marks et al. |
| 9,406,444 | B2 | 8/2016 | Oakes et al. |
| 9,671,670 | B2 | 6/2017 | Hollis et al. |
| 2002/0071622 | A1 | 6/2002 | Betts et al. |
| 2002/0154842 | A1* | 10/2002 | Betts ............... G02F 1/0316 385/2 |
| 2003/0147574 | A1 | 8/2003 | Lam et al. |
| 2006/0067634 | A1 | 3/2006 | Bull et al. |
| 2008/0199124 | A1 | 8/2008 | Nagatsuma et al. |
| 2008/0203506 | A1* | 8/2008 | David ............... G02F 1/025 257/431 |
| 2010/0019872 | A1 | 1/2010 | Bozler et al. |
| 2010/0098424 | A1 | 4/2010 | Ho et al. |
| 2012/0154975 | A1* | 6/2012 | Oakes ............... H04B 1/0458 361/301.4 |
| 2016/0139486 | A1* | 5/2016 | Dagli ............... G02F 1/2257 385/3 |
| 2016/0202592 | A1* | 7/2016 | Hollis ............... G02B 6/14 385/3 |
| 2016/0291352 | A1* | 10/2016 | Kissa ............... G02F 1/0102 |

OTHER PUBLICATIONS

Bertazzi, F. et al., "Self-Consistent Coupled Carrier Transport Full-Wave EM Analysis of Semiconductor Traveling-Wave Devices," IEEE Trans. Microwave Theory Tech., vol. 54, pp. 1611-1618, Apr. 2006.

Chen, H.-W. et al., "25 Gb/s hybrid silicon switch using a capacitively loaded traveling wave electrode," Optics Express, vol. 18, No. 2, pp. 1070-1075, Jan. 18, 2010.

Chen, H.-W. et al., "Forty Gb/s hybrid silicon Mach-Zehnder modulator with low chirp," Optics Express, vol. 19, No. 2, pp. 1455-1460, Jan. 17, 2011.

Cui, Y et al., "Modeling and Design of GaAs Traveling-Wave Electrooptic Modulators Based on Capacitively Loaded Coplanar Strips," J. Lightwave Tech., vol. 24, pp. 544-554, Jan. 2006.

Dagli, "Wide-bandwidth lasers and modulators for RF photonics." IEEE Transactions on microwave theory and techniques 47.7 (1999): 1151-1171.

Dogru, S. et al., "Ultra-Low Voltage Substrate-Removed Mach-Zehnder Intensity Modulators with Integrated Electrical Drivers," Proc. 22nd Annual Meeting IEEE Phot. Soc., Ankara, Turkey, ThG2, pp. 656-657, (2009).

Dogru, S. et al., "Ultra-Wide Bandwidth Design for Very-Low Voltage Substrate-Removed Electro-optic Intensity Modulators," Proc. OSA Adv. Phot. Congress, 1M4A.5 (2012).

Dogru, S., "InGaAlAs/InAlAs Multi Quantum Well Substrate Removed Electro-optic Modulators," Proc. IEEE Photonics Conf., Arlington, VA, ThJ2, pp. 739-740, 2011.

Goldsmith, C. L. et al., "Principles and Performance of Traveling-Wave Photodetector Arrays," IEEE Trans. Microwave Theory Tech., vol. 45, pp. 1342-1350, Aug. 1997.

International Search Report and Written Opinion in International Patent Application No. PCT/US2020/021635, dated Jun. 12, 2020, 10 pages.

Juodawlkis, P. W. et al., "High-Power, Low-Noise 1.5-µm Slab-Coupled Optical Waveguide (SCOW) Emitters: Physics, Devices, and Applications", IEEE Journal of Selected Topics in Quantum Electronics, vol. 17, pp. 1698-1714, Nov.-Dec. 2011.

Juodawlkis, P. W. et al., "InGaAsP/InP quantum-well electrorefractive modulators with sub-volt Vpi", Enabling Photonic Technologies for Aerospace Applications VI, Proc. SPIE, vol. 5435, pp. 53-63 (2004).

Katopodis, V. et al., "Integrated Transmitter for 100 Gb/s OOK Connectivity Based on Polymer Photonics and InP-DHBT Electronics", Optics Express, vol. 27, No. 27, pp. 28538-28543, Dec. 17, 2012.

Klamkin, J. et al., "Uni-traveling-carrier variable confinement waveguide photodiodes," Optics Express, vol. 19, pp. 10199-10205, May 23, 2011.

Macario, J. et al., "Development of Electro-Optic Phase Modulator for 94 GHz Imaging System," Journal of Lightwave Technology, vol. 27, No. 24, pp. 5698-5703, Dec. 15, 2009.

Nagarajan, R. et al., "Effects of Carrier Transport on High-Speed Quantum-Well Lasers", Applied Physics Letters, vol. 59, No. 15, pp. 1835-1837 (1991).

Notification of the Transmittal of the International Search Report and the Written Opinion of the International Searching Authority in related PCT Application No. PCT/US14/40655, filed Jun. 3, 2014, dated Apr. 13, 2015, 18 pages.

Nuccio, S. R. et al., "Modulation and Chirp Characterization of a 100-GHz EO Polymer Mach-Zehnder Modulator," Proc. OSA/OFC/NFOEC 2011, JThA30, (2011), 3 pages.

Sakamoto, S. R. et al., "Narrow gap coplanar slow wave electrode for travelling wave electro-optic modulators," Electronics Letters, vol. 31, pp. 1183-1185, Jul. 6, 1995. 3 pages.

Shin, J. H. et al.,"35-GHz Bandwidth, 5-V-cm Drive Voltage, Bulk GaAs Substrate Removed Electrooptic Modulators", IEEE Photonics Technology Letters, vol. 19, No. 18, pp. 1362-1364, Sep. 15, 2007.

Spickermann, R. et al., "Experimental Analysis of Millimeter Wave Coplanar Waveguide Slow Wave Structures on GaAs", IEEE Transactions on Microwave Theory and Techniques, vol. 42, No. 10, pp. 1918-1924, Oct. 1994.

Spickermann, R. et al., "GaAs/AlGaAs electro-optic modulator with bandwidth >40 Ghz," Electronics Letters, vol. 31, pp. 915-916, May 25, 1995.

Spickermann, R. et al., "Millimetre Wave Coplanar Slow Wave Structure on GaAs Suitable for Use in Electro-Optic Modulators," Electronics Letters, vol. 29, pp. 774-775, Apr. 29, 1993.

Weis, R.S. et al., "Lithium Niobate: Summary of Physical Properties and Crystal Structure," Appl. Phys. A 37, pp. 191-203, (1985).

* cited by examiner

| W [μm] | S [μm] | W_gnd [μm] | n | Z_o [Ohms] |
|---|---|---|---|---|
| 30 | 15 | 125 | 2.36 | 47.0 |
| 60 | 30 | 125 | 2.40 | 50.7 |
| 50 | 25 | 125 | 2.39 | 49.5 |
| 35 | 15 | 125 | 2.36 | 45.2 |
| 40 | 20 | 125 | 2.38 | 48.4 |

FIG. 1D

| W [μm] | S₁ [μm] | W_End [μm] | W_T [μm] | S₂ [μm] | n | Z_p [Ohms] | Type |
|---|---|---|---|---|---|---|---|
| 40 | 65 | 125 | 5 | 5 | 4.05 | 43.9 | A |
| 40 | 65 | 125 | 10 | 5 | 3.29 | 35.6 | A |
| 40 | 65 | 125 | 20 | 5 | 2.90 | 31.4 | A |
| 40 | 65 | 125 | =len 252 | 0 | 2.52 | 27.2 | A |
| 40 | 65 | 125 | 0 | =len 252 | 2.41 | 74.0 | A |
| 40 | 65 | 125 | 5 | 5 | 4.05 | 43.9 | B |

FIG. 2D

| w [μm] | s [μm] | w_end [μm] | f_r [μm] | w_h [μm] | w_r [μm] | L_cell [μm] | n | Z_0 [Ω] |
|---|---|---|---|---|---|---|---|---|
| 40 | 65 | 125 | 5 | 2 | 7 | 25 | 4.03 | 44.1 |
| 40 | 65 | 125 | 10 | 2 | 7 | 25 | 3.98 | 44.7 |
| 40 | 65 | 125 | 20 | 2 | 7 | 25 | 3.86 | 46.1 |
| 40 | 65 | 125 | 27 | 2 | 7 | 25 | 3.78 | 47.1 |
| 40 | 65 | 125 | 5 | 2 | 7 | 50 | 4.03 | 44.1 |
| 40 | 65 | 125 | 10 | 2 | 7 | 50 | 3.98 | 44.7 |
| 40 | 65 | 125 | 20 | 2 | 7 | 50 | 3.86 | 46.1 |
| 40 | 65 | 125 | 27 | 2 | 7 | 50 | 3.78 | 47.1 |
| 40 | 65 | 125 | 28.8 | 0.3 | 7 | 25 | 3.60 | 49.4 |

FIG. 4A

| W [µm] | s [µm] | $w_{gnd}$ [µm] | l [µm] | $w_{th}$ [µm] | $w_r$ [µm] | $l_{cell}$ [µm] | $t_o$ [µm] | $t_n$ [µm] | n | $Z_0$ [Ω] |
|---|---|---|---|---|---|---|---|---|---|---|
| 40 | 65 | 125 | 27 | 2 | 7 | 25 | 1.8 | 0 | 3.78 | 47.1 |
| 40 | 65 | 125 | 5 | 2 | 7 | 25 | 0.8 | 1 | 3.85 | 46.3 |

FIG. 4B

| W [µm] | S [µm] | W_rot [µm] | L_7 [µm] | W_7 [µm] | s [µm] | L_ext [µm] | t_7 [µm] | n | Mean(\|E_rs\|) [V/m] | Z [Ω] | S11 [dB] |
|---|---|---|---|---|---|---|---|---|---|---|---|
| 30 | 25 | 125 | 5.8 | 12 | 7 | 10 | 25 | 10 | 2.04 | 22482 | 65.6 | -16.1 |
| 30 | 25 | 125 | 8.8 | 1 | 7 | 5.5 | 25 | 20 | 2.04 | 50436 | 65.6 | -16.1 |
| 30 | 25 | 125 | 8.3 | 1 | 7 | 6.5 | 25 | 10 | 2.13 | 40363 | 62.4 | -18.1 |
| 40 | 20 | 125 | 5.8 | 1 | 7 | 6.5 | 25 | 10 | 2.06 | 40363 | 55.7 | -24.9 |
| 50 | 15 | 125 | 4.0 | 1 | 7 | 5 | 25 | 10 | 2.03 | 59128 | 48.6 | -37.1 |
| 60 | 10 | 125 | 1.5 | 1 | 7 | 5 | 25 | 6 | 2.02 | 60548 | 40.9 | -20.8 |

FIG. 4C

| W [μm] | s [μm] | $W_{gnd}$ [μm] | $t_c$ [μm] | n | Mean(\|Ex\|) [V/m] | $Z_0$ [Ω] | S11 [dB] |
|---|---|---|---|---|---|---|---|
| 70 | 5 | 125 | 2 | 2.02 | 63881 | 31.5 | -14.7 |
| 70 | 5 | 125 | 3 | 1.96 | 65472 | 32.4 | -15.1 |

FIG. 4D

OPTICAL MODULATOR RF ELECTRODES

CROSS-REFERENCE TO RELATED PATENT APPLICATION(S)

This application claims priority to U.S. Provisional Application No. 62/844,185, filed on May 7, 2019, entitled "Optical Modulator RF Electrodes," which is incorporated herein by reference in its entirety.

GOVERNMENT SUPPORT

This invention was made with Government support under Grant No. FA8702-15-D-0001 awarded by the U.S. Air Force. The Government has certain rights in the invention.

BACKGROUND

An electro-optic modulator is a device that modulates optical signals (i.e., light at THz frequencies) using radio frequency (RF) electrical signals from RF electrodes, such as microwave transmission lines. Specifically, the RF electrodes apply a signal-controlled electric field to an optical waveguide to change the refractive index of the optical waveguide via the electro-optic effect. The change in the refractive index directly affects the velocity of a light beam propagating through the optical waveguide. Thus, light from a source (e.g., a laser) coupled to the optical waveguide may be modulated by modulating the electric field applied to the modulator's electrodes. Electro-optic modulators are used in a variety of applications including telecommunications, on-chip photonic circuits, and optical sensors.

FIGS. 1A-1C show several views of a conventional coplanar waveguide electro-optic intensity modulator 100. Light from the light source is first split into two light beams that propagate along separate optical waveguides 110a and 110b formed in a layer 112 of electro-optic material, such as lithium niobate (LiNbO$_3$), on a substrate 116. An oxide film 114 on the LiNbO$_3$ film 112 acts as cladding that confines light in the optical waveguides 110a and 110b.

The modulator 100 includes a microwave transmission line 102 in the form of a co-planar waveguide with a signal conductor 120 and ground conductors 130a and 130b. As shown in FIGS. 1A and 1B, the signal conductor 120 is located between the ground conductors 130a and 130b and on the substrate 116. The signal conductor 120 is physically separated and electrically isolated from the ground conductors 130a and 130b, resulting in the formation of slots 140a and 140b. The slots 140a and 140b are typically filled with a dielectric and arranged to overlap the optical waveguides 110a and 110b Applying a microwave or RF signal to the microwave transmission line 102 creates an electric field, shown in FIG. 1C, that changes the refractive indices of the optical waveguides 110a and 110b. This refractive index change causes a change in the propagation velocity of one or both light beams. The different propagation velocities combined with the finite length of the microwave transmission line 102 gives rise to a phase difference between the two beams that ranges between 0 and $2\pi$. After passing through the microwave transmission line 102, the two beams are recombined into a single output beam with an intensity that depends on the phase difference. For instance, if the phase difference is equal to 0, the two beams constructively interfere resulting in an output beam with a peak intensity. If the phase difference is equal to $\pi$, the two beams destructively interfere resulting in an output beam with little to no intensity.

The performance of an electro-optic modulator may be evaluated based on the achievable modulation depth and the half-wave voltage, $v_\pi$, that induces a $\pi$ phase shift in the optical beam in one waveguide 110a, 110b. For electro-optic modulators that provide amplitude modulation, these performance metrics are improved, in part, by the following: (1) matching the propagation velocities of the electric field in the slot and the light beam in the optical waveguide to increase the modulation of the light beam, (2) increasing the amplitude of the electric field to increase the change in the refractive index of the optical waveguide and thus the modulation of the light beam, (3) matching the impedance, $Z_o$, of the microwave transmission line to the respective sources and/or loads, which are typically at 50Ω, to reduce signal reflection loss, and (4) decreasing the signal insertion loss into the signal and ground conductors of the microwave transmission line.

The impedance, $Z_o$, and the propagation velocity of the electric field, which is determined by the refractive index, n, of the microwave transmission line, both depend on the capacitance, C, and inductance, L, of the microwave transmission line. The capacitance and the inductance along with the amplitude of the electric field and the signal insertion loss depend on the geometry and arrangement of the signal and ground conductors in the microwave transmission line.

FIG. 1D shows a table of the refractive index, n, and the impedance, $Z_o$, of the electro-optical modulator 100 for different combinations of the signal conductor width (w), the slot width (s), and the ground conductor width ($w_{gnd}$). For the electro-optical modulator 100, the refractive index, n, should preferably be 2 to match the desired refractive index of LiNbO$_3$ at optical frequencies and the impedance should preferably be 50Ω. As shown, a decrease in the refractive index results in a corresponding decrease in the impedance, $Z_o$, which prevents the microwave transmission line 102 from achieving the desired refractive index and impedance.

SUMMARY

For a conventional electro-optic modulator, the properties of the microwave transmission line that affect performance (C, L, the electric field distribution, the microwave signal insertion loss) are typically coupled such that a change to one property to improve one aspect of the electro-optic modulator causes a corresponding change to another property that makes another aspect of the electro-optic modulator worse. For example, the microwave transmission line may be designed to increase the electric field at the expense of a larger mismatch in the impedance. As a result, undesirable compromises are made in conventional electro-optic modulators between the various properties of the microwave transmission line, which can degrade the modulator's overall performance.

The present disclosure is thus directed to electro-optic modulators with one or more capacitive structures in the microwave transmission line to enable more independent tuning of the characteristics affecting performance compared to conventional electro-optic modulators. An exemplary electro-optic modulator may include an optical waveguide and a microwave transmission line with a signal conductor and a ground conductor. The microwave transmission line may include one or more capacitive structures that are electrically coupled to one or both of the signal and ground conductors.

The capacitive structure may tune the capacitance, C, of the microwave transmission line without appreciably affecting the inductance, L, of the microwave transmission line.

This may be accomplished by making the capacitive structure substantially thinner than the signal and ground conductors such that the inductance of the microwave transmission line is determined primarily by the geometry of the signal conductor, the ground conductor, and the slot formed by the signal and ground conductors. Additionally, the capacitive structure may include structural features to increase the amplitude and/or uniformity of the electric field near the optical waveguide. The signal insertion losses in the microwave transmission line are also determined by the geometry and arrangement of the signal conductor, the ground conductor, and the slot.

The capacitive structure may include a fang, which is a structural element that extends from either the signal conductor or the ground conductor into the slot and towards the optical waveguide. The fang reduces the gap between the signal and ground conductors, changing the capacitance of the microwave transmission line. The fang's width is measured parallel to an optical axis of the optical waveguide and is typically less than the length of the signal and the ground conductors. The fang extends from the signal and/or ground conductor up to but not past the optical waveguide. For example, if the optical waveguide is centered in the slot, the fang's length, which is measured perpendicular to the optical axis of the optical waveguide, is less than half the width of the slot.

The fang may also include a hook, which is a structure that extends (e.g., perpendicularly) from the fang into the slot and towards the optical waveguide. A fang with a hook is also referred to as a "hook-fang" structure. The hook may be an elongated member that provides a higher amplitude and more uniform electric field near the optical waveguide. For example, the hook may have a length measured parallel to the optical axis that is greater than the width of the fang. Thus, the hook occupies a greater fraction of the length of the signal and/or ground conductors than the fang, where the conductors' lengths are also measured parallel to the optical axis of the optical waveguide. The hook and the fang may have substantially similar thicknesses or different thicknesses.

The hook-fangs may have various shapes and arrangements. In one example, the hook-fang may form a L-shape as viewed normal to the plane of a substrate supporting the optical waveguide and the microwave transmission line. For example, the fang and the hook may be joined at a right angle. In another example, the hook-fang may form a T-shape as viewed normal to the plane of a substrate. For example, the fang and the hook may be joined at a right angle, but one end of the fang may be coupled to a middle portion of the hook. The hook and the fang may also be disposed on a surface of the substrate or formed in a separate layer within the substrate. For example, the fang may be deposited onto the surface of the substrate and the hook formed below the surface of the substrate for a more desirable placement near the optical waveguide.

In general, the capacitive structure may include a plurality of structural elements (e.g., fangs, hook-fangs) that extend from the signal conductor and/or the ground conductor. The structural elements may be further arranged in a periodic array that spans the length of the signal and/or ground conductor. In some cases, the signal and ground conductors may both have capacitive structures with a plurality of structural elements. The capacitive structures of the signal and the ground conductors may be aligned or offset along the optical axis. Additionally, the capacitive structures of the signal and the ground conductors may also be arranged in a symmetric manner. For example, the capacitive structures of the signal and the ground conductors may have reflection symmetry about an axis parallel to the optical axis and centered in the slot. In another example, the capacitive structures of the signal and the ground conductors may have two-fold rotational symmetry about an axis normal to the plane of the substrate.

In one example, an electro-optic modulator includes an optical waveguide formed in an electro-optic material to guide an optical wave and a microwave transmission line disposed over the electro-optic material to guide an electrical signal that modulates a refractive index of the electro-optic material. The microwave transmission line includes a ground conductor on the substrate parallel to the optical waveguide with a first thickness, a ground capacitive structure extending from the ground conductor on the substrate toward the optical waveguide with a second thickness less than the first thickness, a signal conductor on the substrate parallel to the optical waveguide and the ground conductor with a third thickness, and a signal capacitive structure extending from the signal conductor on the substrate toward the optical waveguide with a fourth thickness less than the third thickness.

In another example, an electro-optic modulator includes an optical waveguide formed in an electro-optic material to guide an optical wave and a microwave transmission line disposed over the electro-optic material to guide an electrical signal that modulates a refractive index of the electro-optic material. The microwave transmission line includes a ground conductor disposed on the substrate and oriented parallel to the optical waveguide, a signal conductor disposed on the substrate and oriented parallel to the optical waveguide and the ground conductor, and a first capacitive structure electrically coupled to one of the ground conductor and the signal conductor. The signal conductor and the ground conductor define a slot that overlaps the optical waveguide. The signal conductor and the ground conductor set an inductance of the microwave transmission line and the first capacitive structure sets a capacitance of the microwave transmission line independently from the inductance.

In another example, an electro-optic modulator includes an optical waveguide formed in an electro-optic material to guide an optical wave and a microwave transmission line disposed over the electro-optic material to guide an electrical signal that modulates a refractive index of the optical waveguide. The microwave transmission line includes at least one first structure that sets an inductance of the microwave transmission line and at least one second structure that sets a capacitance of the microwave transmission line independent of the inductance of the microwave transmission line.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 1D shows a table of refractive index and impedance values for the electro-optic modulator of FIG. 1A for various signal conductor, ground conductor, and gap dimensions.

FIG. 2D shows a table of the refractive index and the impedance of the electro-optic modulators of FIGS. 2A and 2B for different conductor, gap, and fang widths.

FIG. 4A shows a table of refractive index and impedance values for the electro-optic modulator of FIG. 3A for various conductor, gap, hook, and fang dimensions.

FIG. 4B shows a table of refractive index and impedance values for the electro-optic modulator of FIG. 3A for different oxide and nitride film thicknesses.

FIG. 4C shows a table of refractive index, mean electric field, impedance, and reflection coefficient S11 values of the electro-optic modulator of FIG. 3A for various conductor, gap, fang, and unit cell dimensions.

FIG. 4D shows a table of the refractive index, the mean electric field, the impedance, and the reflection coefficient S11 of a conventional coplanar waveguide for various conductor and gap dimensions.

DETAILED DESCRIPTION

Following below are more detailed descriptions of various concepts related to, and implementations of an electro-optic modulator with capacitive structures that enable independent tuning of microwave transmission line capacitance and inductance, a stronger and more uniform electric field near an optical waveguide, and lower microwave insertion losses. Specifically, capacitive structures with fangs or hook-fangs are described herein. The concepts introduced above and discussed in greater detail below may be implemented in multiple ways. Examples of specific implementations and applications are provided primarily for illustrative purposes to enable those skilled in the art to practice the implementations and alternatives apparent to those skilled in the art.

The figures and example implementations described below are not meant to limit the scope of the present implementations to a single embodiment. Other implementations are possible by interchanging some or all of the described or illustrated elements. Moreover, where certain elements of the disclosed example implementations may be partially or fully implemented using known components, in some instances only those portions of such known components that are necessary for an understanding of the present implementations are described, and detailed descriptions of other portions of such known components are omitted so as not to obscure the present implementations.

In the discussion below, various examples of inventive electro-optic modulators are provided, wherein a given example or set of examples showcases one or more particular features of a capacitive structure with a hook and/or a fang. One or more features discussed in connection with a given example of a capacitive structure may be employed in other examples of capacitive structures, such that the various features disclosed herein may be readily combined in a given electro-optic modulator according to the present disclosure (provided that respective features are not mutually inconsistent).

1. A Capacitive Structure with Fangs

Figure 2A:
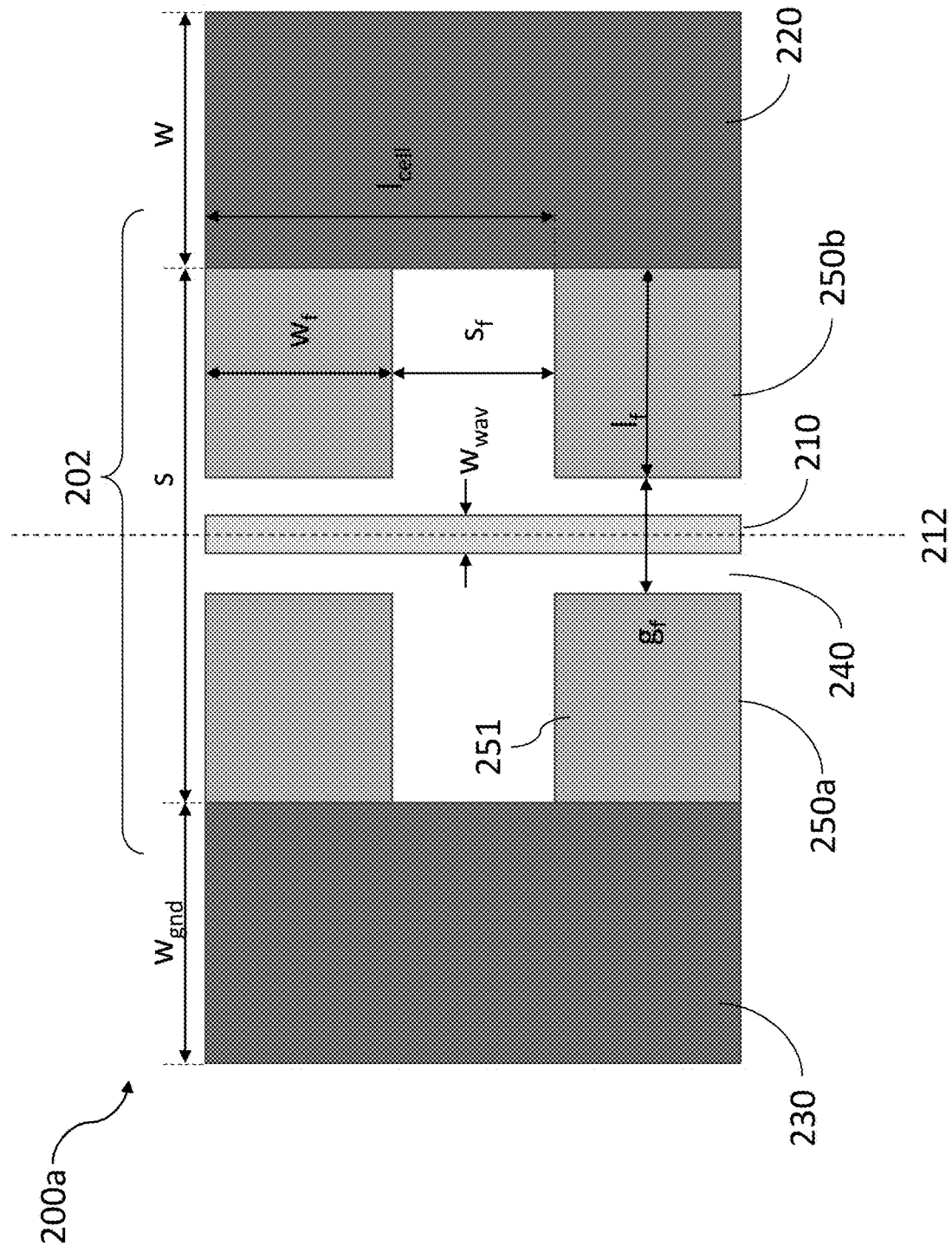
FIG. 2A shows a portion of an exemplary electro-optic modulator with aligned fangs on the signal and ground conductors.
Figure 2B:
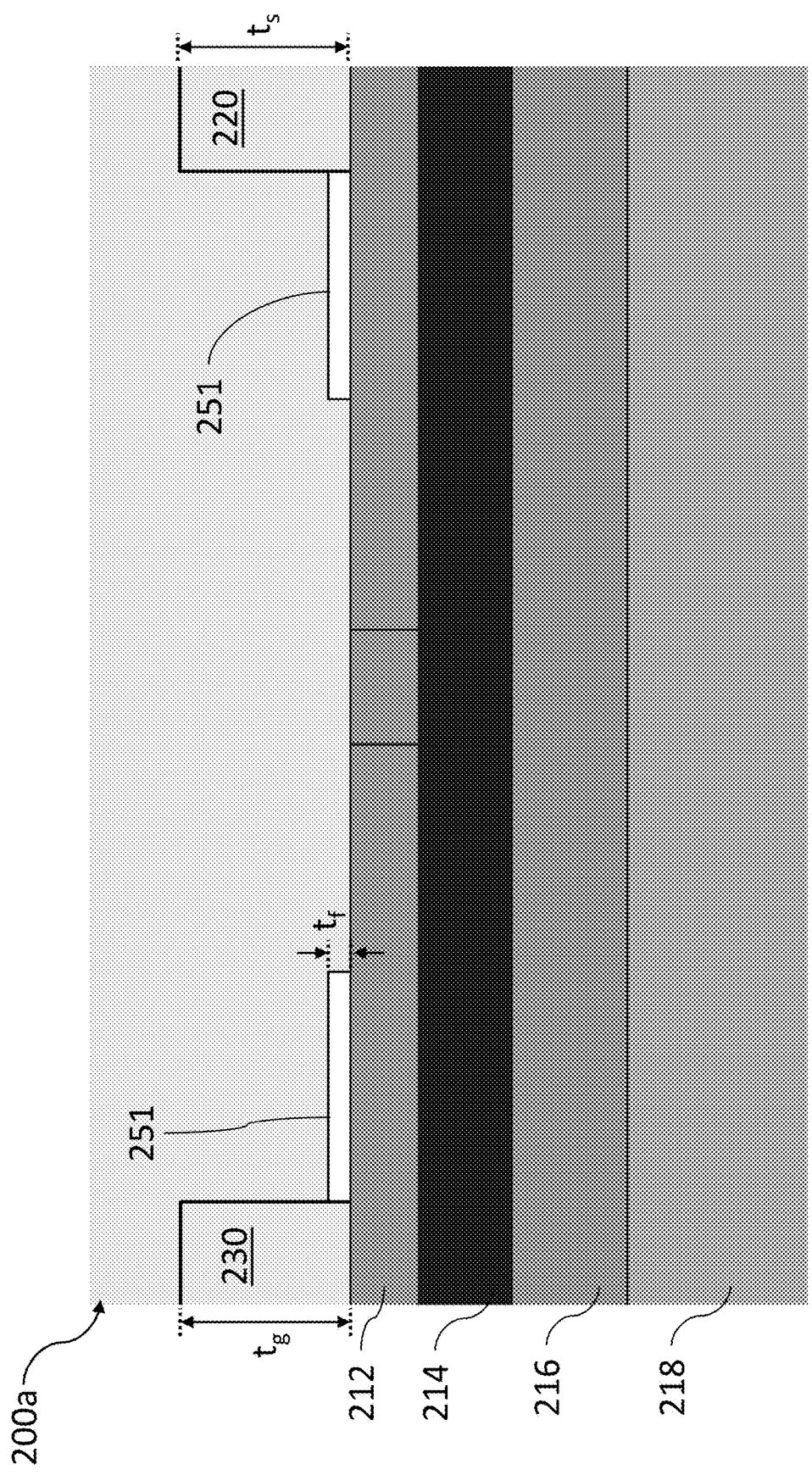
FIG. 2B shows a cross-sectional view of the electro-optic modulator of FIG. 2A.

FIGS. 2A and 2B shows a portion of an exemplary electro-optic modulator 200a with capacitive structures 250a and 250b that enable independent control of the modulator's capacitance and inductance. As shown, the electro-optic modulator 200a may include an optical waveguide 210 to guide a light beam from a light source (not shown) and a microwave transmission line 202 to guide an electric field. The microwave transmission line 202 may include a signal conductor 220 and a ground conductor 230. The signal conductor 220 and the ground conductor 230 are physically separated and electrically isolated from each other and define a slot 240 that overlaps with the optical waveguide 210. The microwave transmission line 202 also includes capacitive structures 250a and 250b (collectively referred to as capacitive structure 250), which are electrically coupled to the ground conductor 230 and the signal conductor 220, respectively. As shown, the capacitive structures 250a and 250b include multiple fangs 251 that protrude from the ground conductor 230 and the signal conductor 220, respectively, into the slot 240 towards the optical waveguide 210.

The capacitive structures 250 enable the capacitance, C, and the electric field distribution of the microwave transmission 202 to be tuned without appreciably changing the inductance, L, or the microwave signal insertion loss. The capacitive structures 250 enable improvements to various properties of the electro-optic modulator 200a relevant to performance without negatively affecting other properties. For example, the electro-optic modulator 200a can (1) better match the propagation velocities of the electric field in the slot 240 and the light beam in the optical waveguide 210 to increase the modulation depth and efficiency of the light beam, (2) increase the amplitude of the electric field and thus increase the strength of modulation of the light beam, (3) better match the impedance, $Z_o$, of the microwave transmission line 202 to the impedance of the microwave signal source (e.g., 50Ω) to reduce signal reflection loss, and (4) decrease the microwave signal insertion loss into the signal conductor 220 and the ground conductor 230.

The electro-optic modulator 200a may operate in a similar manner to other electro-optic modulators. The optical waveguide 210 may be coupled to a light source (not shown) to receive and guide a light beam from the light source. As the light beam propagates along the optical waveguide 210, the signal conductor 220 may receive an electrical signal from a source (e.g., a time varying voltage source). Applying the electrical signal to the signal conductor 220 and capacitive structure 250b generates an electric field. The ground conductor 230 and the capacitive structure 250a act as a sink to the electric field and are both grounded. A portion of the electric field passes through the optical waveguide 210, resulting in a change in the refractive index of the optical waveguide 210 via the electro-optic effect. The change in refractive index modifies the velocity of the light beam propagating in the optical waveguide 210.

The electrical signal may be modulated at microwave frequencies (e.g., 100 MHz to 300 GHz), thus producing a modulated electric field and, hence, a modulated light beam. The modulated electric field may propagate in the slot 240 alongside the light beam at a propagation velocity determined by the structure of the microwave transmission line 202. This velocity may depend, in part, on the dielectric medium of the slot 240, the material forming the optical waveguide 210, and any other materials near the optical waveguide 210 (e.g., an oxide film, a nitride film).

1.1 The Optical Waveguide

The optical waveguide 210 may be formed from a material supporting an electro-optic effect, where the refractive index of the material changes based on an applied electric field. Various electro-optic materials may be used to form the optical waveguide 210 including, but not limited to lithium niobate (LiNbO$_3$), di-deuterium phosphate (KD*P=DKDP), potassium titanyl phosphate (KTP), beta-barium borate (BBO), lithium tantalate (LiTaO$_3$) or ammonium dihydrogen phosphate (NH$_4$H$_2$PO$_4$, ADP). The dimensions of the optical waveguide 210 (e.g., the width $w_{wav}$), may be tailored to support a desired waveguide mode at a desired optical wavelength (e.g., single-mode operation at 1310 nm or 1550 nm).

The optical waveguide 210 may be fabricated using well-known semiconductor fabrication processes (e.g., photolithography, physical or chemical vapor deposition, wet or dry etching). For example, FIG. 2B shows the optical waveguide 210 may be formed by depositing a layer 212 of the desired electro-optic material onto a substrate 218. The electro-optic layer 212 may then be subject to ion implantation to form the optical waveguide 210 with the desired geometry and dimensions. The electro-optic layer 212 may have a thickness of about 200 nm.

Additional layers may also be included to confine light in the optical waveguide 210. For instance, FIG. 2B shows the electro-optic modulator 200a also includes an oxide film 214 and a nitride film 216, which each have a refractive index that is lower than that of the optical waveguide 210. The oxide film 214 and the nitride film 216 may also be used to tune the refractive index of the microwave transmission line 202 based on the respective thicknesses of the films 214 and 216.

In another example, the optical waveguide 210 may be formed in a substrate (not shown) by removing a portion of the substrate to create a recessed slot and filling the slot with the desired electro-optic material. In yet another example, the substrate may be formed from an electro-optic material and the optical waveguide 210 may be formed by altering a portion of the substrate (e.g., doping a section of the substrate to increase the refractive index).

1.2 The Signal and Ground Conductors

In the electro-optic modulator 200a, the inductance of the microwave transmission line 202 and the microwave signal insertion loss depend primarily on the shape and dimensions of the signal conductor 220, the ground conductor 230, and the slot 240. (The capacitive structures 250 generally don't affect the inductance or microwave insertion loss.) In general, the signal conductor 220 and the ground conductor 230 may be strips of electrically conducting material that are oriented parallel to an optical axis 212 of the optical waveguide 210 and span an appreciable fraction of the length of the optical waveguide 210.

For example, FIG. 2A shows the signal conductor 220 and the ground conductor 230 may have substantially constant cross-sections such that the respective widths of the signal conductor (w), the ground conductor ($w_{gnd}$), and the slot (s) do not appreciably change along the length of the optical waveguide 210. The signal conductor 220 and the ground conductor 230 may be formed as films deposited onto the substrate 218. The signal conductor 220 and the ground conductor 230 may be coplanar. The signal conductor 220 and the ground conductor 230 may also be formed from various electrically conducting materials including, but not limited to silver and gold.

Figure 1A:
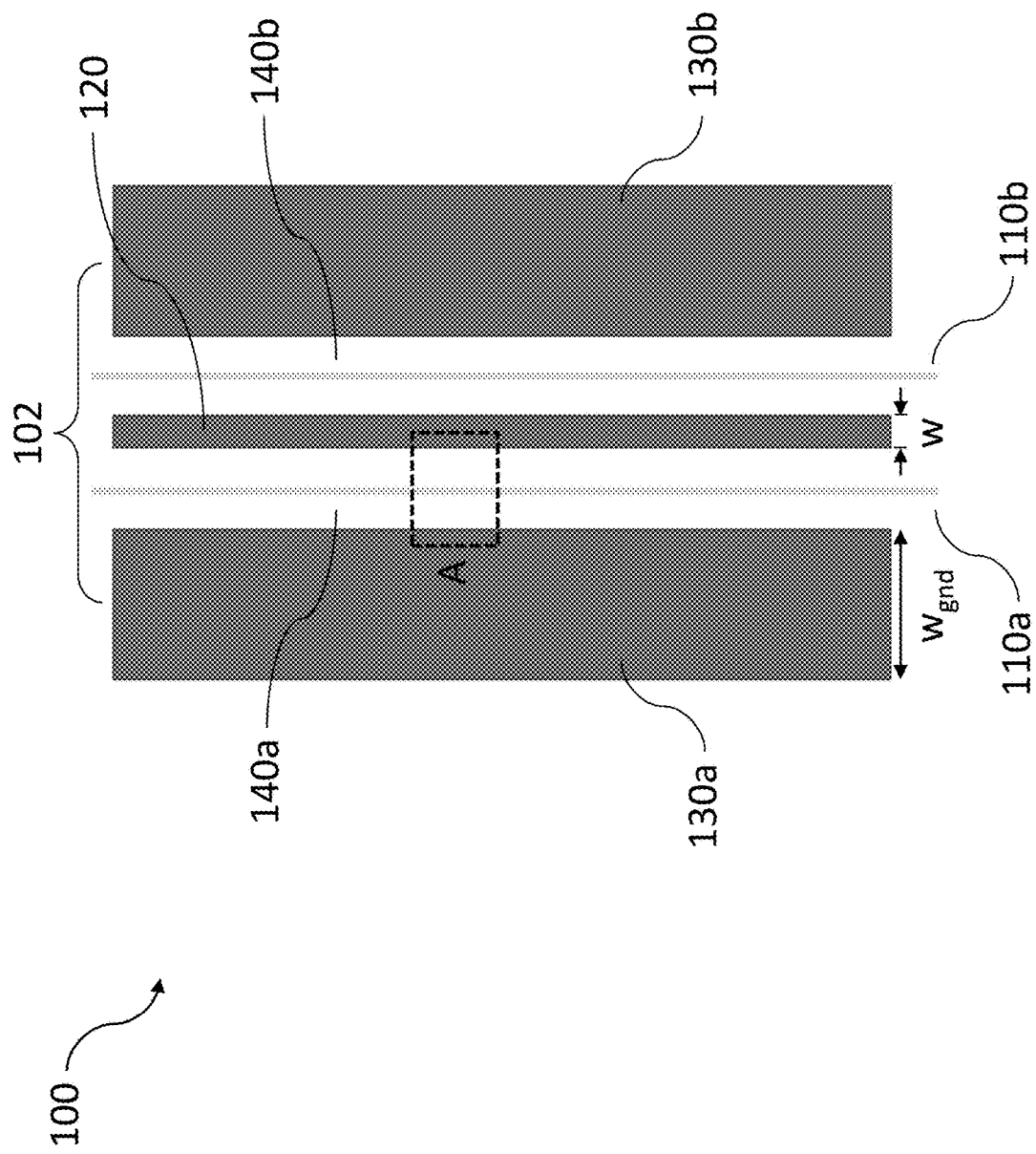
FIG. 1A shows a coplanar waveguide electro-optic modulator.
Figure 1B:
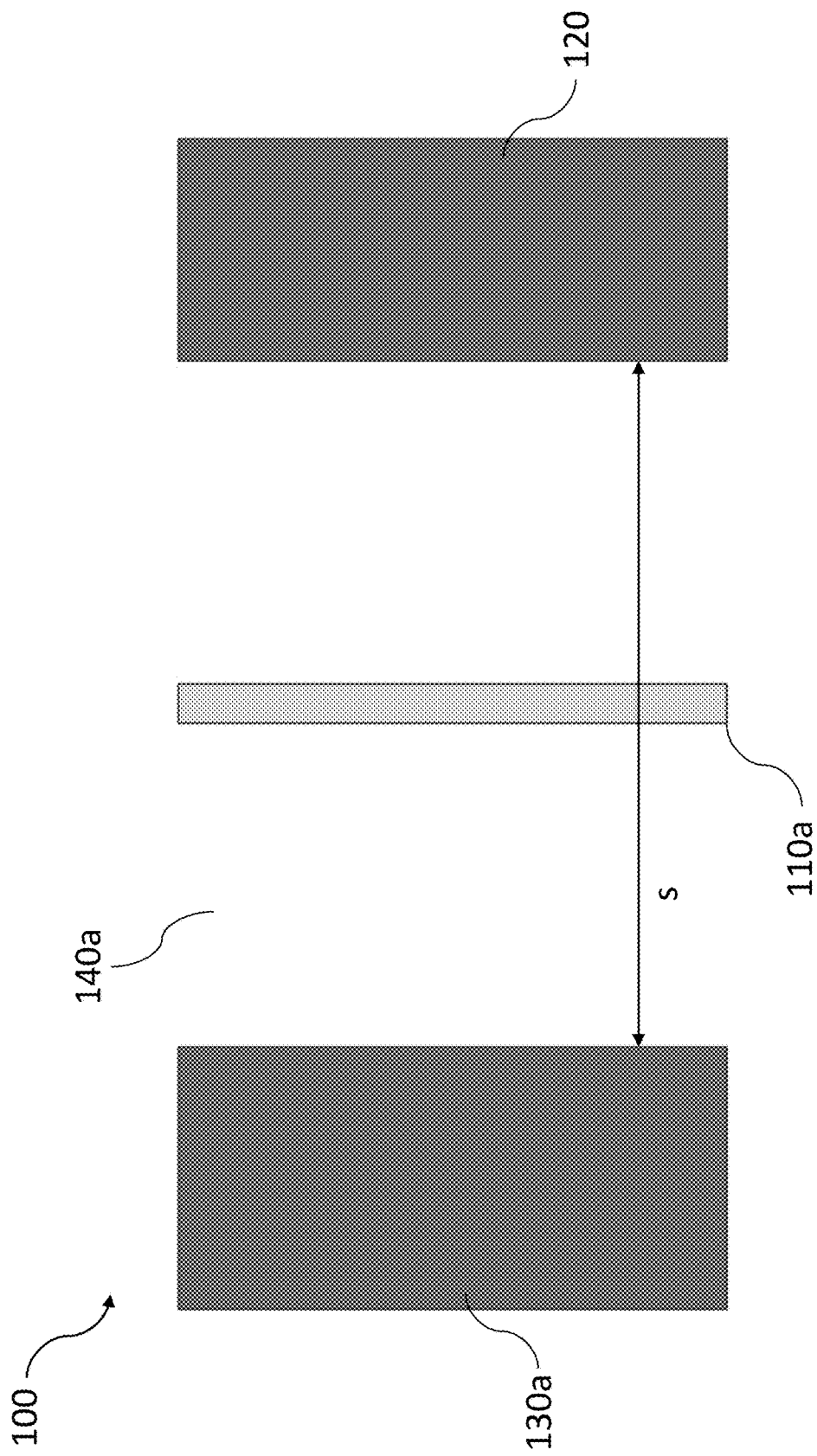
FIG. 1B shows a magnified view of inset A of FIG. 1A.
Figure 1C:
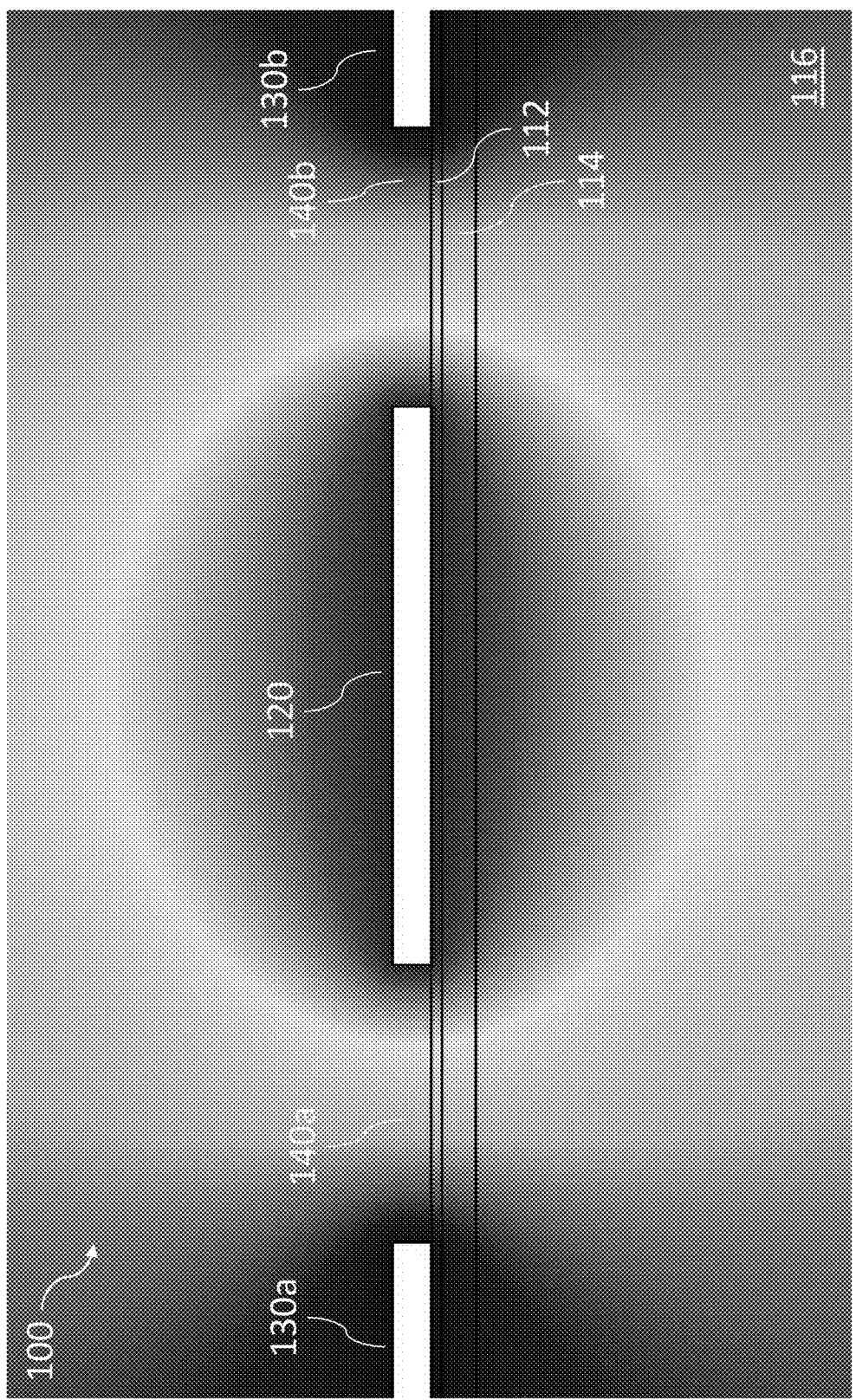
FIG. 1C shows a cross-sectional view of the electro-optic modulator of FIG. 1A and an electric field distribution.

In some cases, the electro-optic modulator 200a may include a second optical waveguide 210, e.g., as in FIG. 1A. In these cases, the electro-optic modulator 200a may include a second ground conductor 230 (not shown) where the signal conductor 220 and the pair of ground conductors 230 form a coplanar waveguide. Additionally, the signal conductor 220 and the pair of ground conductors 230 may have respective capacitive structures 250 that extend into the respective slots 240 formed by the signal conductor 220 and the pair of ground conductors 230.

For the signal conductor 220, the ground conductor 230, and the slot 240 depicted in FIG. 2A, the inductance and the signal insertion loss may be modified by changing the widths of the signal conductor (w), the ground conductor ($w_{gnd}$), and the slot (s). For example, the signal insertion loss may depend primarily on the widths w and $w_{gnd}$ at low operating frequencies and, hence, may be reduced by increasing w and/or $w_{gnd}$. At high operating frequencies, skin-effect losses may become appreciable and, in some instances, may be the primary contributor to the signal insertion loss. For example, a wide signal conductor 220 and ground conductor 230 and a narrow slot 240 may exhibit a higher signal insertion loss compared to a narrow signal conductor 220 and ground conductor 230 and a wide slot 240. Thus, the signal insertion loss may be reduced at high operating frequencies by increasing the s as well as increasing w and/or $w_{gnd}$.

For the electro-optic modulator 200a, the width of the signal conductor w may range between about 30 µm and about 60 µm. The width of the ground conductor $w_{gnd}$ may be about 125 µm. The width of the slots may range between about 5 µm and about 80 µm. The thickness of the signal conductor 220 ($t_s$) and the ground conductor 230 ($t_g$) may range between about 1 µm and about 10 µm.

1.3 The Capacitive Structure

As described above, the capacitive structure 250 is incorporated into the microwave transmission line 202 to decouple the various properties of the microwave transmission line 202 that affect the performance of the electro-optic modulator 200a. For the electro-optic modulator 200a, the capacitance of the microwave transmission line 202 and the electric field distribution depend primarily on the shape and dimensions of the capacitive structure 250 and not the signal conductor 220, the ground conductor 230, or the slot 240. This may be accomplished, in part, by making the capacitive structure 250 sufficiently thinner than the signal conductor 220 and the ground conductor 230 such that the effect of the capacitive structure 250 on the inductance of the microwave transmission line 202 is negligible. For example, the capacitive structure 250 may have a thickness ($t_f$) that ranges between about 10 nm and about 300 nm.

The capacitive structure 250 may generally include one or more structural elements disposed in the slot 240 and electrically coupled to either the signal conductor 220 or the ground conductor 230. The structural elements of the capacitive structure 250 may modify the electric field distribution by effectively changing the geometry of the microwave transmission line 202 that generates and receives the electric field in the slot 240. Additionally, the structural elements of the capacitive structure 250 may modify the capacitance by effectively changing the gap separating the signal conductor 220 and the ground conductor 230.

Generally, the electro-optic modulator 200a may include a capacitive structure 250 coupled to the signal conductor 220 and/or the ground conductor 230. The structural elements of the capacitive structure 250 may also have a different shape, size, and/or spacing in cases where the capacitive structure includes an array of structural elements. The capacitive structure 250 may be formed from various electrically conducting materials including, but not limited to silver and gold.

The electro-optic modulator 200a in FIGS. 2A and 2B includes capacitive structures 250a and 250b that are electrically coupled to the ground conductor 230 and the signal conductor 220, respectively. As shown, the capacitive structures 250a and 250b may each include multiple fangs 251 as the structural elements. Each fang 251 may be a rectangular protrusion extending from the ground conductor 230 or the signal conductor 220 towards the optical waveguide 210. And each fang 251 may have a width ($w_f$) parallel to the optical axis 212 and a length ($l_f$) perpendicular to the optical axis 212. In some cases, the length $l_f$ of the fang 251 may be tailored such that the fang 251 does not extend past the optical waveguide 210 in the slot 240. In other words, if the optical waveguide 210 is centered with the slot 240, the length $l_f$ of the fang 251 may be less than the half the width of the slot.

The fangs 251 in the capacitive structure 250 may also be arranged into a periodic array. Each fang 251 may be spaced apart from its neighboring fang(s) 251 by a distance ($s_f$) parallel to the optical axis 212. Thus, a unit cell may be defined in the periodic array of fangs 251 with a length ($l_{cell}$) that equals the sum of the separation distance $s_f$ and the width $w_f$. In cases where the electro-optic modulator 200a includes capacitive structures 250a and 250b and each of the capacitive structures 250a and 250b includes an array of fangs 251, the respective arrays of fangs 251 may be aligned or offset with respect to each other. The magnitude of the offset may depend, in part, on the desired uniformity of the electric field along the length of the optical axis 212.

Figure 2C:
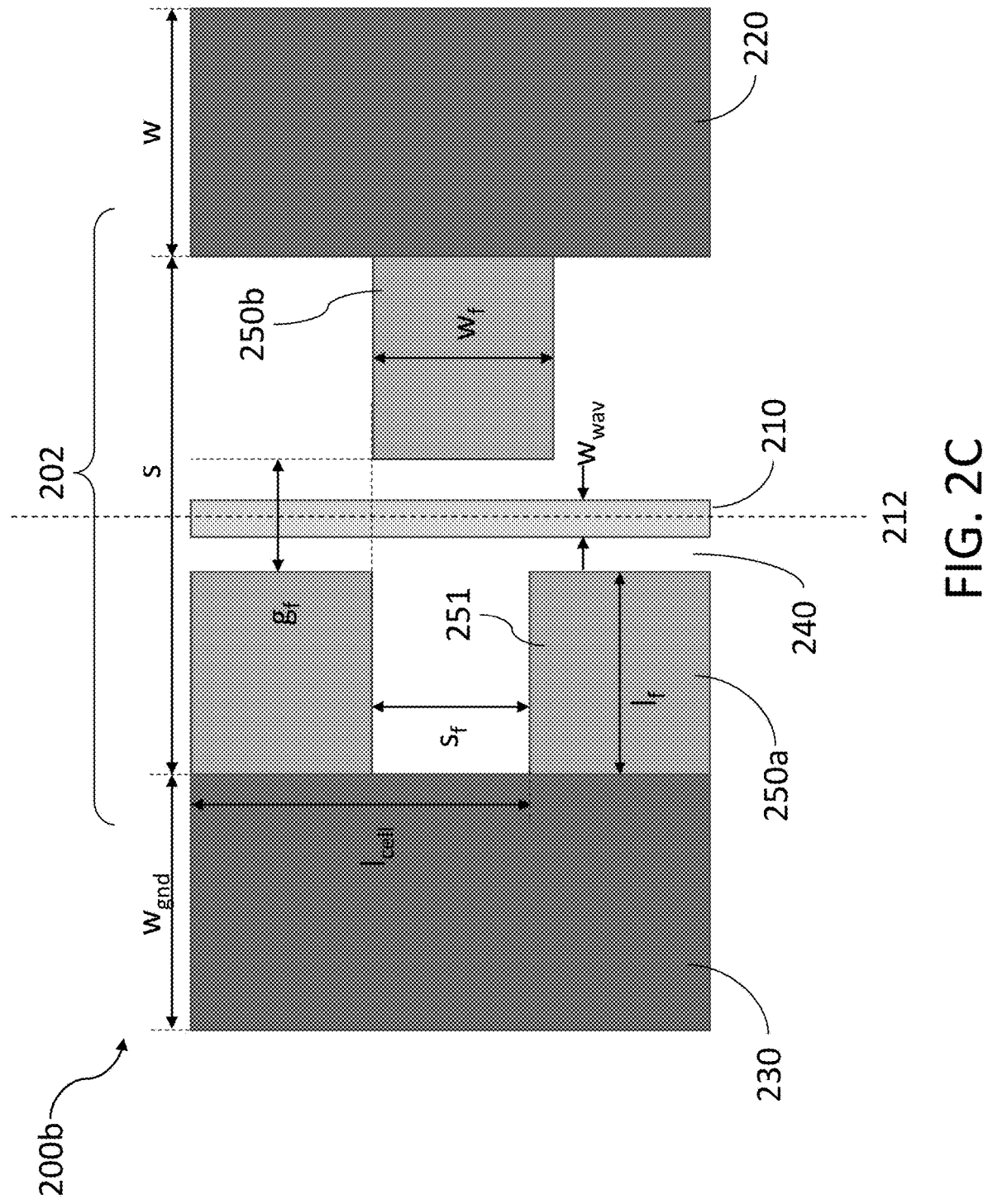
FIG. 2C shows a portion of an exemplary electro-optic modulator with offset fangs on the signal and ground conductors.

For example, FIG. 2A shows the fangs 251 in the capacitive structures 250a and 250b are aligned such that each fang 251 in the capacitive structure 250a is aligned to a corresponding fang 251 in the capacitive structure 250b located at the same location along the optical axis 212. That is, the fangs 251 have mirror symmetry across the optical waveguide 210. In another example, FIG. 2C shows an exemplary electro-optic modulator 200b where the fangs 251 in the capacitive structures 250a and 250b are offset with respect to each other by a distance equal to the width $w_f$ of the fang 251. In this case, though not necessarily, the fangs 251 have two-fold rotational symmetry about an axis perpendicular to the plane of the conductors 220 and 230.

In examples where the capacitive structure 250 includes the fangs 251, the dimensions and placement of the fangs 251 affect the capacitance of the microwave transmission line 202 and the electric field distribution. For example, the extension of the fang 251 into the slot 240 effectively reduces the gap between the signal conductor 220 and the ground conductor 230 (e.g., the gap $g_f$), thus changing the capacitance. The fang 251 also provides an electrically conductive element that is closer to the optical waveguide 210 than the signal conductor 220 and the ground conductor 230, increasing the amplitude of the electric field in the optical waveguide 210.

For the electro-optic modulator 200a, the width $w_f$ of the fang 251 may range between about 2 µm and about 10 µm. The length $l_f$ of the fang 251 may range between about 4 µm and about 50 µm. The separation distance $s_f$ between neighboring fangs 251 may range between about 2 µm and about 15 µm. If the microwave transmission line 202 includes both the capacitive structures 250a and 250b, the respective fangs 251 of the capacitive structures 250a and 250b may be separated by the gap $g_f$ perpendicular to the optical axis 212. The gap $g_f$ may range between about 2 µm and about 30 µm.

To convey the impact of the capacitive structure 250 on the properties of the electro-optic modulators 200a and 200b, FIG. 2D shows a table of the refractive index, n, and the impedance, $Z_o$, of the microwave transmission line 202 for various widths $w_f$ and separation distances $s_f$. The dimensions of the signal conductor 220, the ground conductor 230, and the slot 240 were kept constant at 40 µm, 125 µm, and 65 µm, respectively, thus the inductance of the microwave transmission line 202 remained unchanged. Additionally, the gap $g_f$ between the respective fangs 251 in the capacitive structures 250a and 250b was equal to 5 µm.

As shown, the width $w_f$ can have an appreciable effect on the refractive index and the impedance. As the width $w_f$ is reduced from 20 µm to 5 µm for a separation distance $s_f$ of 5 µm, the refractive index and the impedance each increase by about 40%. FIG. 2D also shows the refractive index and the impedance with and without the fangs 251 corresponding to cases where the width $w_f$ is equal to the length of the unit cell and the distance $s_f$ is equal to the length of the unit cell, respectively. As shown, the refractive index may remain similar, but the impedance may decrease by nearly a factor of 3 when the fangs 251 span the length of the optical waveguide 210.

Additionally, the alignment of the respective fangs 251 in the capacitive structures 250a and 250b do not appreciably affect the capacitance as evidenced by the refractive index and the impedance being identical for the electro-optic modulator 200a and the electro-optic modulator 200b when the dimensions and spacing of the fangs 251 are the same. The similar capacitance between the electro-optic modulator 200a and the electro-optic modulator 200b may be attributed, in part, to the gap $g_f$ being similar to the distance $s_f$. The alignment of the respective fangs 251 in the capacitive structures 250a and 250b, however, may affect the electric field in the optical waveguide 210. In this manner, the alignment may provide a parameter to tune the average electric field in the optical waveguide 210 without appreciably changing the capacitance of the microwave transmission line 202.

2. A Capacitive Structure with L-Shaped Hook-Fang Structures

Figure 3A:
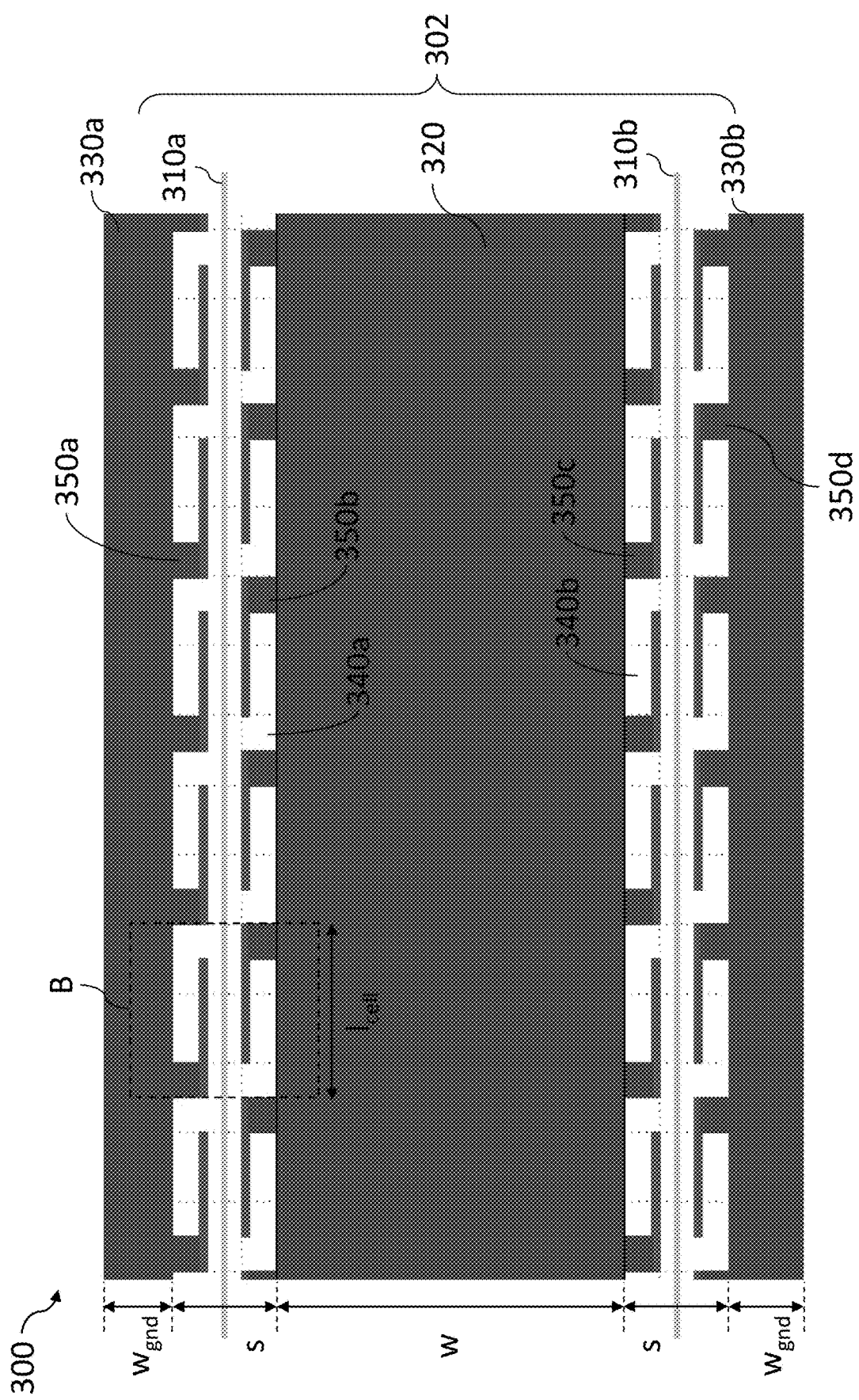
FIG. 3A shows an exemplary electro-optic modulator with hooks and fangs on the signal and ground conductors arranged to form L-shaped structures with rotational symmetry about an axis normal to the electro-optic modulator substrate.

FIG. 3A shows an exemplary electro-optic modulator 300 with capacitive L-shaped hook-fang structures 350a, 350b, 350c, and 350d. As shown, the electro-optic modulator 300 may include a pair of optical waveguides 310a and 310b and a microwave transmission line 302. The microwave transmission line 302 may include a signal conductor 320 and parallel ground conductors 330a and 330b defining slots 340a and 340b. The microwave transmission line 302 may further include a capacitive structure 350a electrically coupled to the ground conductor 330a, a capacitive structure 350b electrically coupled to the signal conductor 320 and disposed in the slot 340a, a capacitive structure 350c electrically coupled to the signal conductor 320 and disposed in the slot 340b, and a capacitive structure 350d electrically coupled to the ground conductor 330b. The electro-optic modulator 300 may incorporate similar structural features and materials as the electro-optic modulators 200a and 200b.

Figure 3B:
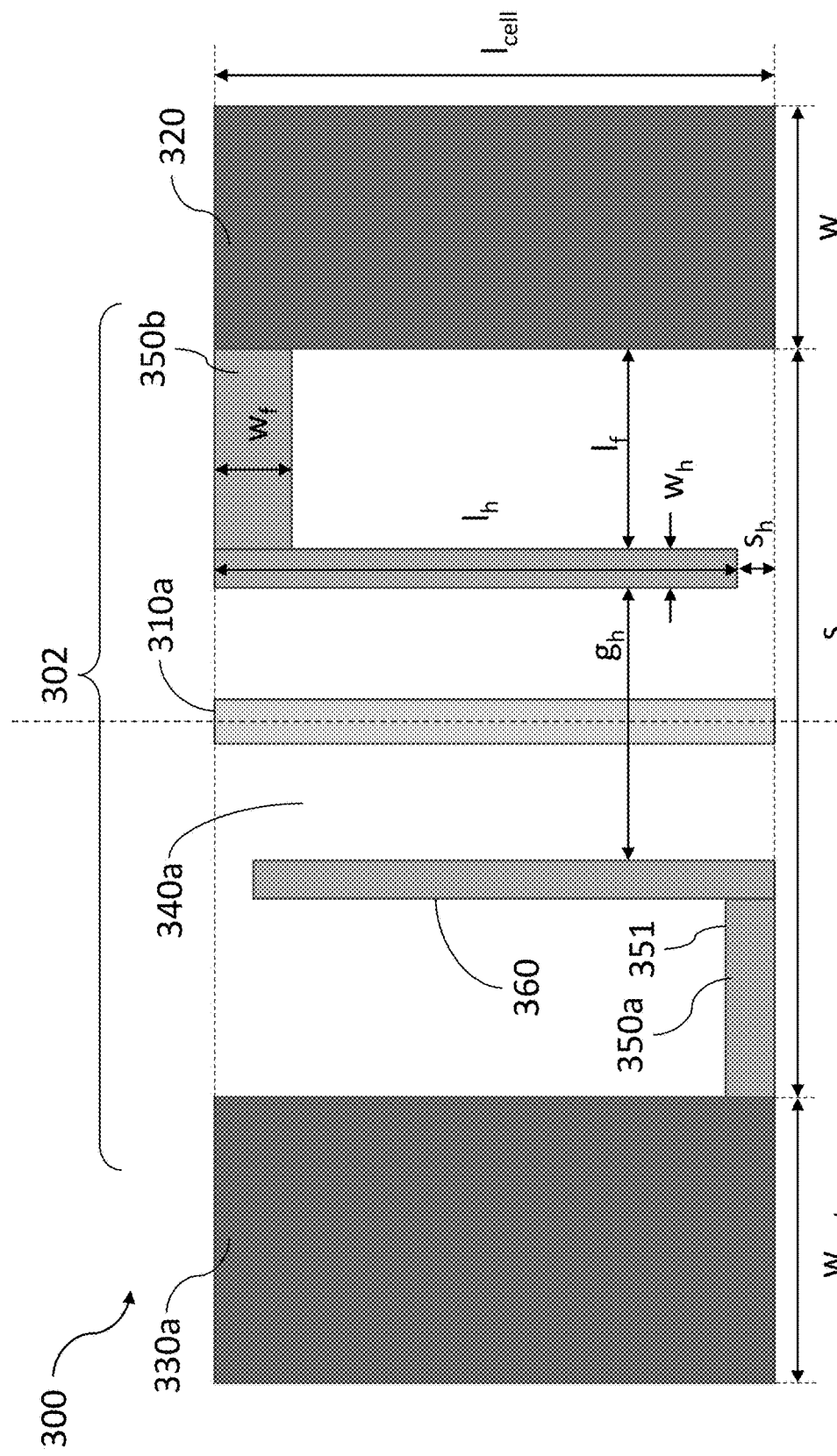
FIG. 3B shows a magnified of the unit cell B in the electro-optic modulator of FIG. 3A.

As shown, the capacitive structures 350a, 350b, 350c, and 350d (collectively referred to herein as capacitive structure 350) may include a periodic array of structural elements. FIG. 3B shows a magnified view of the unit cell B in FIG. 3A. As shown, the capacitive structures 350a and 350b may each include a fang 351 and a hook 360 forming a hook-fang structure. The hook 360 provides another structural element in addition to the fang 351 to further tune the capacitance of the microwave transmission line 302 and the electric field distribution without affecting the inductance microwave transmission line 302 and the signal insertion loss.

In particular, the hook 360 may provide an electrically conducting element that spans a substantial fraction of the length ($l_{cell}$) of the unit cell B. In other words, the hooks 360 in the array of hook-fangs provide a nearly uninterrupted conductor spanning the length of the optical waveguide 310a. Together, the fangs 351 and hooks 360 may provide a higher amplitude and more uniform electric field in the optical waveguide 310a compared to the fang-only capacitive structures 250 of the electro-optic modulators 200a and 200b. The fang 351, meanwhile, may still be the primary element affecting the capacitance of the microwave transmission line 302. In this manner, the hook-fang structure may enable more independent tuning of the capacitance and the electric field distribution compared to the electro-optic modulators 200a and 200b.

As before, the fang 351 may protrude from the signal conductor 320 or the ground conductor 330a into the slot 340a. The fang 351 may be a rectangular protrusion with a width ($w_f$) parallel to an optical axis 312 of the optical waveguide 310a and a length ($l_f$) perpendicular to the optical axis 312. The hook 360 may be an elongated member that is oriented parallel to the optical axis 312. The hook 360 may also extend from the fang 351 towards the optical waveguide 310a.

As shown in FIG. 3B, the hook 360 may be rectangular in shape and joined to the fang 351 to form an L-shaped structure as viewed normal to the plane of a substrate supporting the optical waveguide 310a and the microwave transmission line 302. The fang 351 and the hook 360 may be joined at a right angle via respective ends of the fang 351 and the hook 360. The hook 360 has a width ($w_h$) perpendicular to the optical axis 312 and a length ($l_h$) parallel to the optical axis 312. The hook 360 is separated from a neighboring hook 360 by a distance ($s_h$) parallel to the optical axis 312. The hook-fangs in the capacitive structure 350a and 350b may also have a symmetric arrangement. For example, the hook-fangs may be aligned to have a reflection symmetry across the optical axis 312. In another example, FIG. 3B shows the hook-fangs may have two-fold rotational symmetry about an axis normal to the plane of a substrate supporting the electro-optic modulator 300.

The respective hooks 360 in the capacitive structures 350a and 350b may be separated from each other by a gap ($g_h$) perpendicular to the optical axis 312. Additionally, a portion of the hook 360 may be offset from the signal conductor 320 or the ground conductor 330a by a gap equal to the length $l_f$ of the fang 351. The presence of the hooks 360 in the slot 340a may affect the capacitance of the microwave transmission line 302 depending on the length $l_f$ and the gap $g_h$. However, the contributions of the hook 360 to the capacitance may be substantially reduced by making the hooks 360 thin (i.e., reducing the width $w_h$) such that the capacitance is primarily determined by the width $w_f$ of the fang 351 and the separation distance between neighboring fangs 351.

For the electro-optic modulator 300, the dimensions of the signal conductor 320 (e.g., the width w), the ground conductor (e.g. the width $w_{gnd}$), the slot 340 (e.g., the width s), and the fang 351 (e.g., the width $w_f$, the length $l_f$) may be similar to the electro-optic modulators 200a and 200b described above. The width $w_h$ of the hook 360 may range between about 50 nm and about 2 µm. The length 361 of the hook 360 may range between about 10 µm and about 50 µm. The separation distance $s_h$ may be about 5 µm. The thickness ($t_h$) of the hook 360 may range between about 10 nm and about 300 nm. In some cases, the hook 360 may be thinner than the fang 351 to further reduce the effects of the hook 360 on the capacitance of the microwave transmission line 302.

Figure 3C:
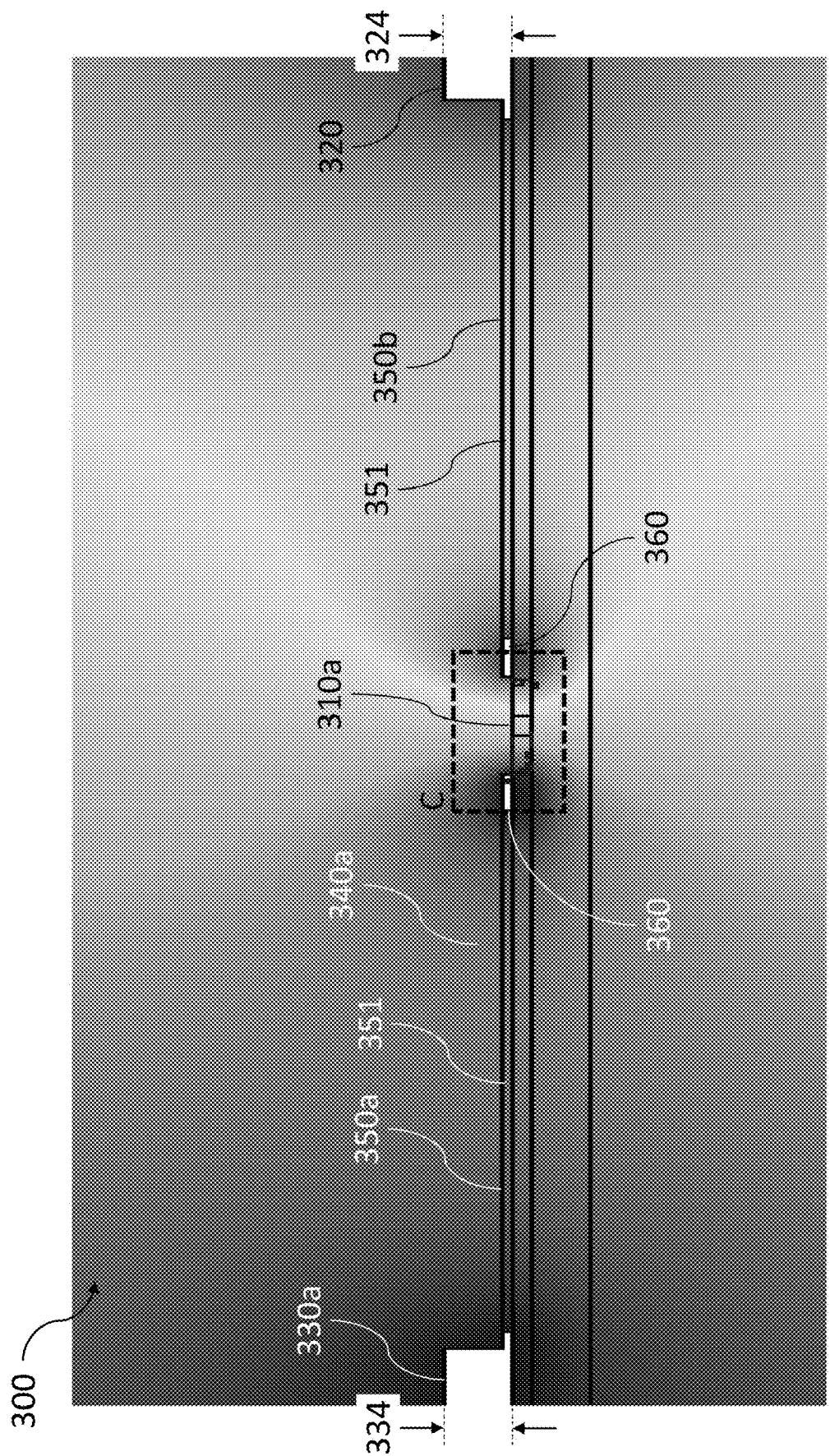
FIG. 3C shows the electric field distribution along a cross-sectional view of the electro-optic modulator of FIG. 3A.
Figure 3D:
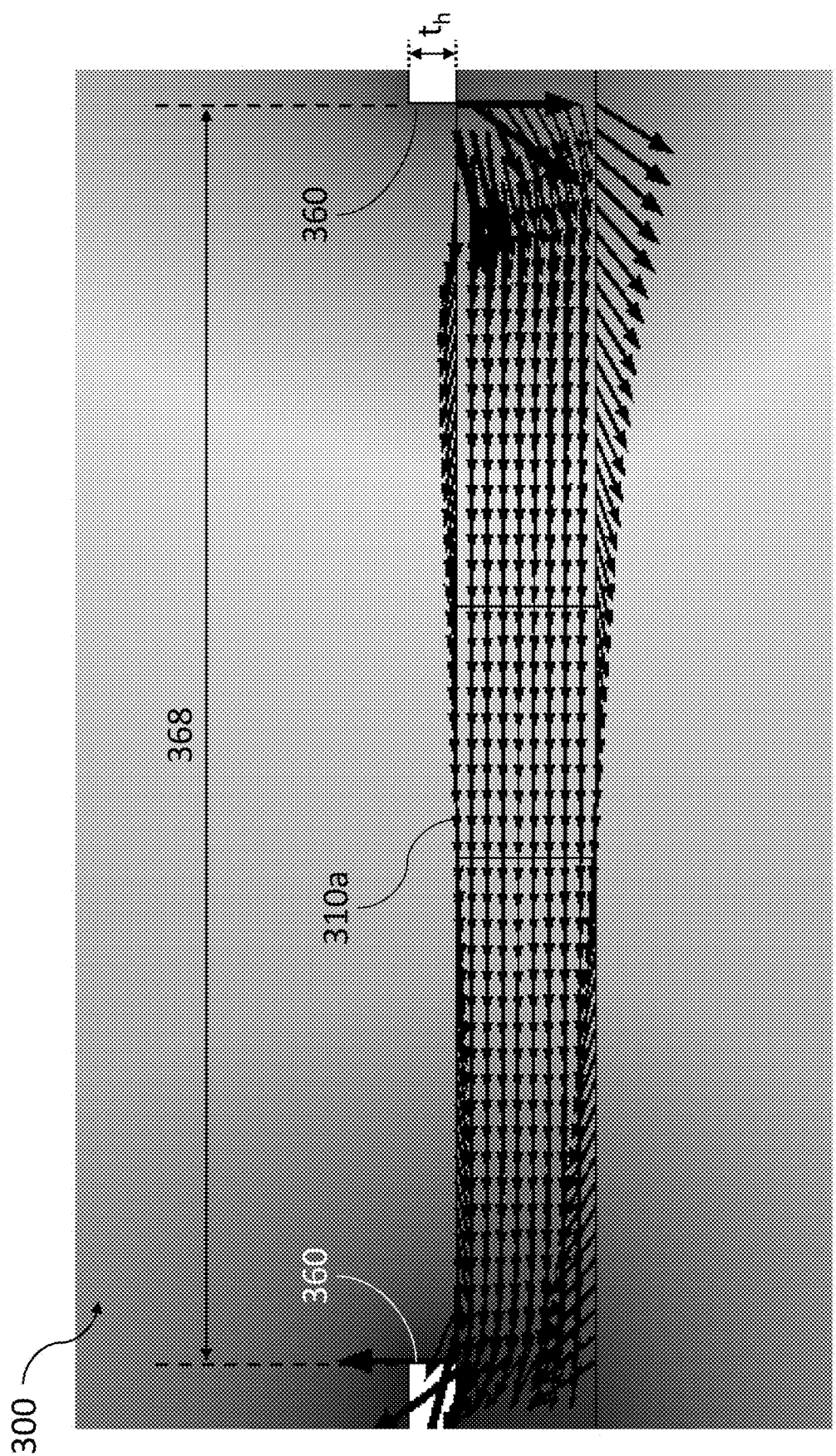
FIG. 3D shows a magnified view of inset C of FIG. 3C.

FIG. 3C shows a cross-sectional view of the electro-optic modulator 300 with a representative electric field distribution. FIG. 3D shows a magnified view of the optical waveguide 310a disposed between the respective hooks 360 of the capacitive structures 350a and 350b. Poynting vector field lines in FIGS. 3C and 3D show the propagation direction of the electric field between the signal conductor 320 and the ground conductor 330a. As shown, the amplitude and direction of the electric field is substantially uniform across the optical waveguide 310a.

FIG. 4A shows a table of the refractive index, n, and the impedance, Zo, of the microwave transmission line 302 for various values of the length $l_f$ of the fang 351, the width $w_h$ of the hook 360, and the length $l_{cell}$ of the unit cell. The dimensions of the signal conductor width w, the ground conductor width $w_{gnd}$, the slot width s, the width $w_f$ of the fang 351 were kept constant at 40 µm, 125 µm, and 65 µm, respectively. As shown, the length $l_f$ of the fang 351, which determines the gap between the hook 360 and the signal conductor 320 or the ground conductor 330a, affects the capacitance as evidenced by the impedance changing for different lengths $l_f$. However, a reduction in the width $w_h$ of the hook 360 may reduce the contributions of the hook 360 to the capacitance as evidenced by an increase in the impedance when the width $w_h$ decreases from 2 µm to 300 nm.

FIG. 4B shows a table of the refractive index and the impedance of the microwave transmission line 302 for various thicknesses of an oxide film ($t_o$) and a nitride film ($t_n$). As described above, the optical waveguide 310a may include an oxide film and a nitride film disposed below an electro-optic film. The oxide and nitride films may be used, in part, tune the refractive index of the microwave transmission line 302 by varying the respective thicknesses of the oxide and nitride films.

FIG. 4C shows a table of the refractive index, the impedance, the mean magnitude of the electric field, and the reflection coefficient S11 for various values of the signal conductor width the slot width s, the length $l_f$ of the fang 351, the width $w_f$ of the fang 351, the width $w_h$ of the hook 360, the gap $g_h$ between respective hooks 360 in the capacitive structure 350a and 350b, and the oxide thickness $t_o$. For comparison, FIG. 4D shows a table of the refractive index, the impedance, the mean magnitude of the electric field, and the reflection coefficient S11 for a conventional coplanar waveguide. As shown, the electro-optic modulator 300 achieves an impedance that more closely matches 50Ω resulting in lower signal reflection losses than a conventional coplanar waveguide while providing a similar refractive index and electric field amplitude.

3. A Capacitive Structure with T-Shaped Hook-Fang Structures

Figure 5A:
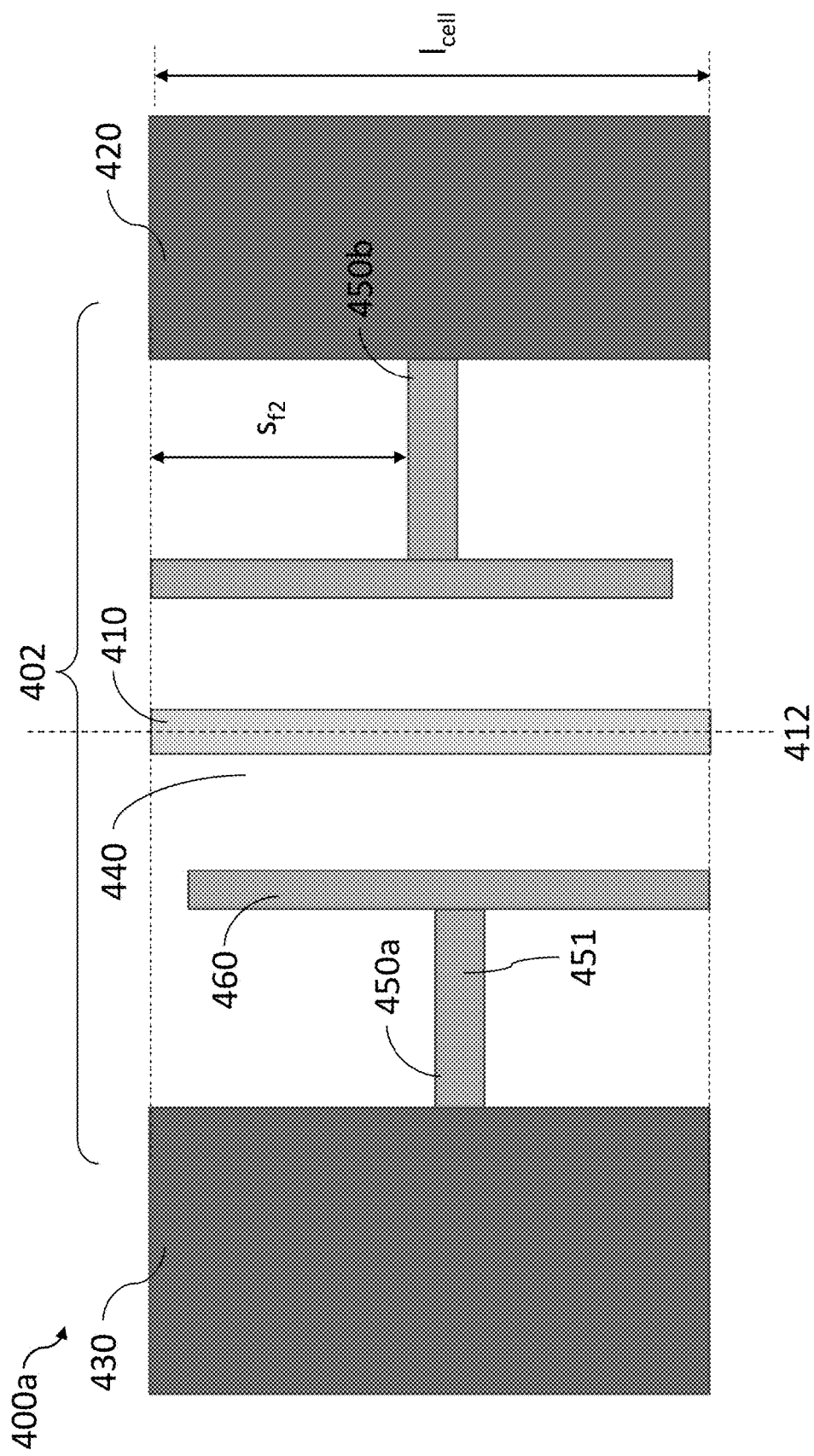
FIG. 5A shows a portion of an exemplary electro-optic modulator with hooks and fangs on the signal and ground conductors arranged to have a T-shaped structure.

FIG. 5A shows a unit cell of length ($l_{cell}$) in an exemplary electro-optic modulator 400a with T-shaped hook-fang capacitive structures 450a and 450b. As shown, the electro-optic modulator 400a may include an optical waveguide 410 and a microwave transmission line 402. As before, the microwave transmission line 402 may include a signal conductor 420, a ground conductor 430, and a slot 440 formed between the signal conductor 420 and the ground conductor 430. The microwave transmission line 402 may further include capacitive structures 450a and 450b (collectively referred to herein as capacitive structure 450) electrically coupled to the ground conductor 430 and the signal conductor 420, respectively.

As shown, the capacitive structure 450 may include a fang 451 and a hook 460 that are joined to form a T-shaped structure as viewed normal to the plane of a substrate supporting the optical waveguide 410 and the microwave transmission line 402. The fang 451 and the hook 460 be joined at a right angle where the fang 451 is coupled to a middle portion of the hook 460 located a distance ($s_{f2}$) parallel to an optical axis 412 of the optical waveguide 410 from one end of the hook 460. The fang 451 and the hook 460 may provide similar functions as the electro-optic modulator 300 to tune the capacitance and the electric field distribution, respectively.

Figure 5B:
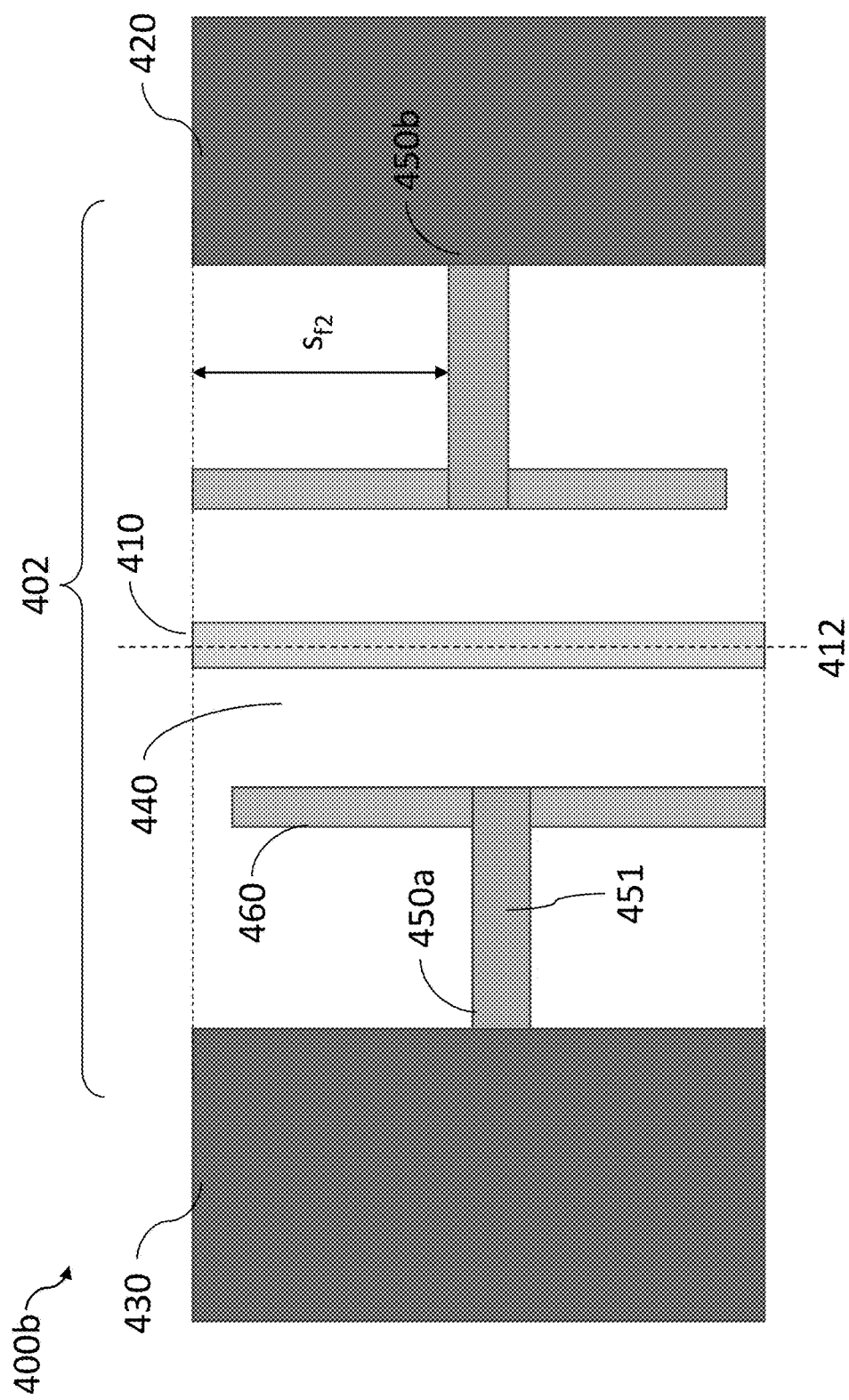
FIG. 5B shows a portion of an exemplary electro-optic modulator with hooks and fangs on the signal and ground conductors where the hooks and the fangs are not coplanar.
Figure 5C:
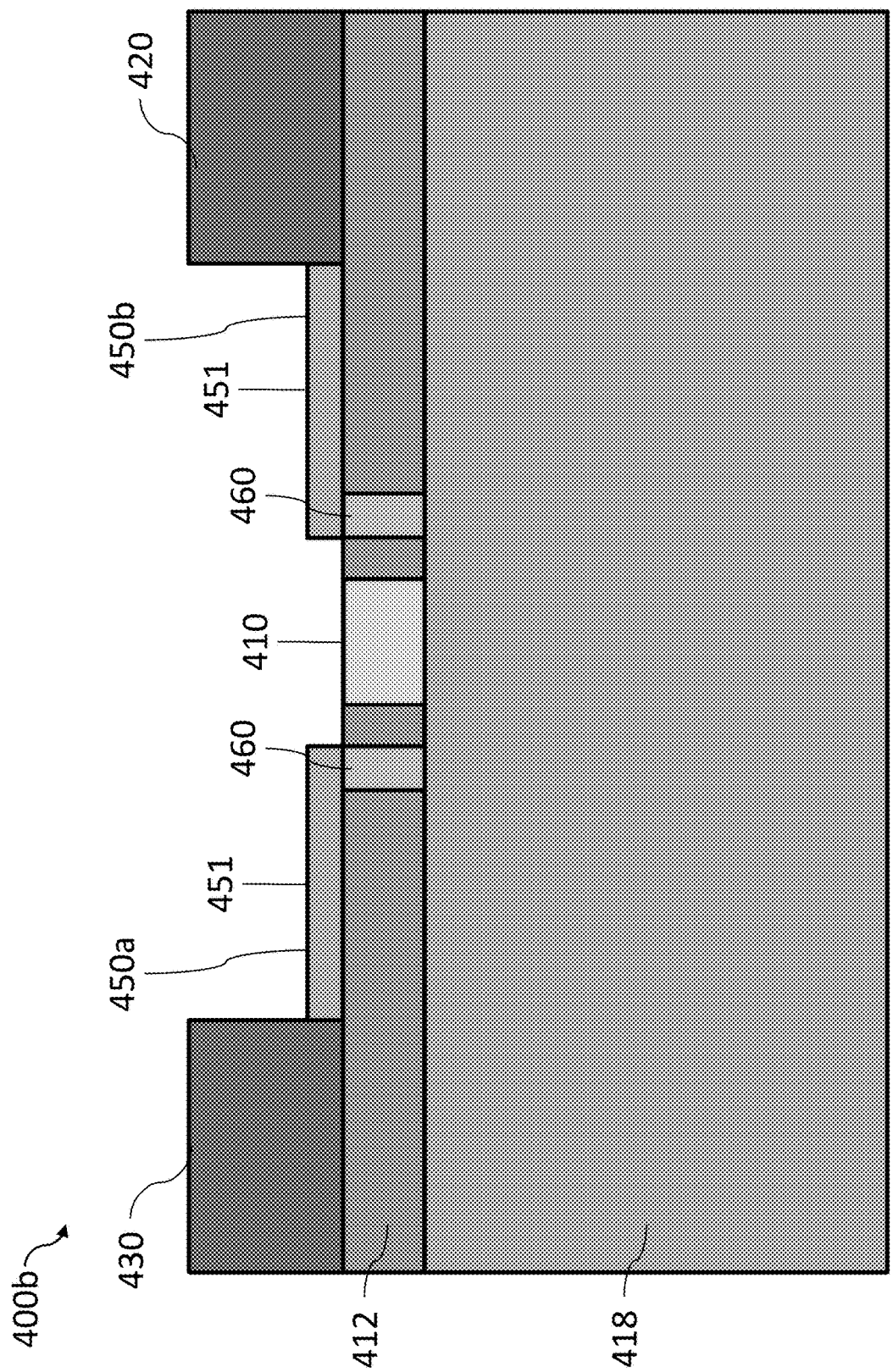
FIG. 5C shows a cross-sectional view of the electro-optic modulator of FIG. 5B.

FIG. 5B shows a unit cell in an exemplary electro-optic modulator 400b with capacitive structures 450a and 450b that include a periodic array of hook-fangs where the hooks 460 and the fangs 451 are formed onto different layers (i.e., not coplanar). For example, FIG. 5C shows the fang 451 may be disposed on the surface of an electro-optic film 412 supported by a substrate 418. The hook 460 may be formed in the electro-optic film 412 for more desirable placement near the optical waveguide 410. The fang 451 and the hook 460 may be electrically coupled by a vertical interconnect (e.g., a via).

4. A Capacitive Structure with Vertical-Fang Structures

Figure 6A:
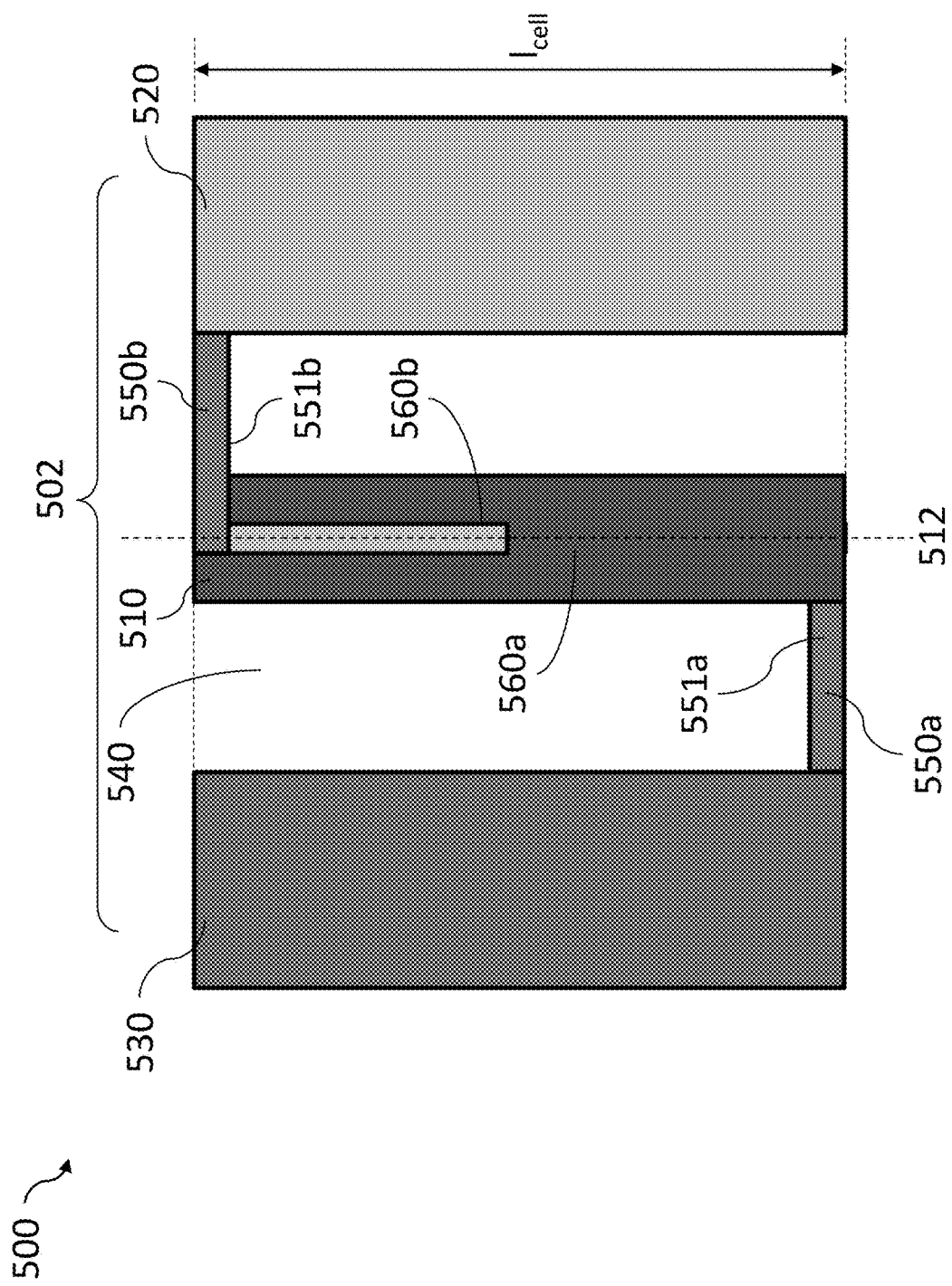
FIG. 6A shows a portion of an exemplary electro-optic modulator with vertical-fangs extending into a substrate and hooks formed in the substrate.

FIG. 6A show a unit cell of length ($l_{cell}$) in an exemplary electro-optic modulator 500 with capacitive structures 550a and 550b that include vertically oriented fangs 551a and 551b, respectively. As shown, the electro-optic modulator 500 may include an optical waveguide 510 and a microwave transmission line 502. As before, the microwave transmission line 502 may include a signal conductor 520, a ground conductor 530, and a slot 540 formed between the signal conductor 520 and the ground conductor 530. The microwave transmission line 502 may further include capacitive structures 550a and 550b electrically coupled to the ground conductor 530 and the signal conductor 520, respectively.

The light propagating through the optical waveguide 510 generates an evanescent field in the media surrounding the optical waveguide 510. If an electrically conductive element (e.g., the capacitive structures 550a and 550b) is placed sufficiently close to the optical waveguide 510, the evanescent field may couple to the electrically conductive element resulting in appreciable optical losses. Generally, the optical losses increase as the distance between the optical waveguide 510 and the electrically conductive element decreases, thus limiting the separation distance between the capacitive structures 550a and 550b and the optical waveguide 510.

Figure 6B:
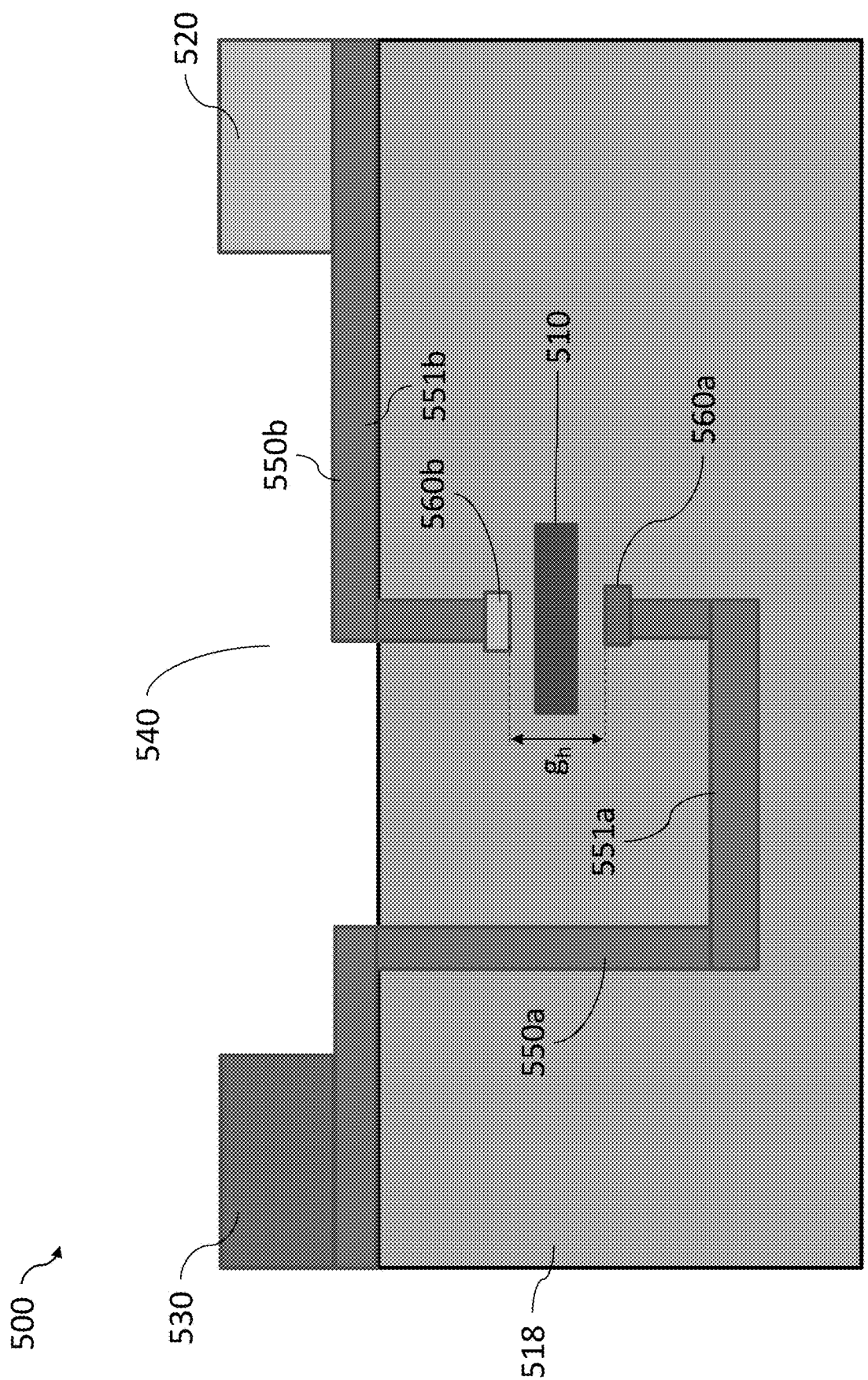
FIG. 6B shows a cross-sectional view of the electro-optic modulator of FIG. 6A.

The decay length of the evanescent field, however, may vary based on the geometry of the optical waveguide 510. For example, FIG. 6B shows the optical waveguide 510 may be formed in a substrate 518 with a rectangular-shaped cross-section. For this geometry, the evanescent field may have a shorter decay length along the vertical direction compared to the horizontal direction. To take advantage of the shorter decay length along the vertical direction, the capacitive structures 550a and 550b provide an electrically conductive element located above and below the optical waveguide 510, respectively. In this manner, the capacitive structures 550a and 550b may increase the amplitude of the electric field in the optical waveguide 510 without appreciably increasing optical losses. The stronger electric field may further reduce the half-wave voltage, in the electro-optic modulator 500.

As shown in FIG. 6B, the capacitive structure 550a may include a fang 551a with multiple portions that extend vertically into the substrate 518 in order to position a hook 560a beneath the optical waveguide 510. The fang 551a may extend further below the optical waveguide 510 to ensure only the electric field from the hook 560a interacts with the optical waveguide 510. The capacitive structure 550b may similarly include a fang 551b with a portion that extends vertically into the substrate 518 to position a hook 560b above the optical waveguide 510. The hooks 560a and 560b may be separated by the gap $g_h$, which is oriented vertically instead of horizontally as before in the electro-optic modulator 300.

The fangs 551a and 551b may be formed from a multi-step process that includes the formation of multiple layers of electrically conductive material connected by an electrically conductive, vertically oriented element (e.g., a via). Additionally, the hooks 560a and 560b may span along a portion of the length of the unit cell such that the hooks 560a and 560b do not overlap as viewed normal to the plane of the substrate 518 (see FIG. 6A). In other cases, the hooks 560a and 560b may extend along an appreciable fraction of the unit cell length such that substantial overlap occurs between the hooks 560a and 560b (see electro-optic modulator 300 of FIG. 3B).

For the electro-optic modulator 500, the dimensions of the signal conductor 520, the ground conductor 530, the slot 540, and the hooks 560a and 650b may be similar to the electro-optic modulator 300 described above. The fangs 551a and 551b may have similar dimensions to the fang 351 of the electro-optic modulator 300. Additionally, the height of the fangs 551a and 551b along the vertical direction may vary based on the placement of the optical waveguide 510 in the substrate 518. For example, the fangs 551a and 551b may be dimensioned such that the hooks 560a and 560b form a gap $g_h$ that ranges between about 200 nm and about 30 μm.

5. A Capacitive Structure with a Comb Electrode

Figure 7A:
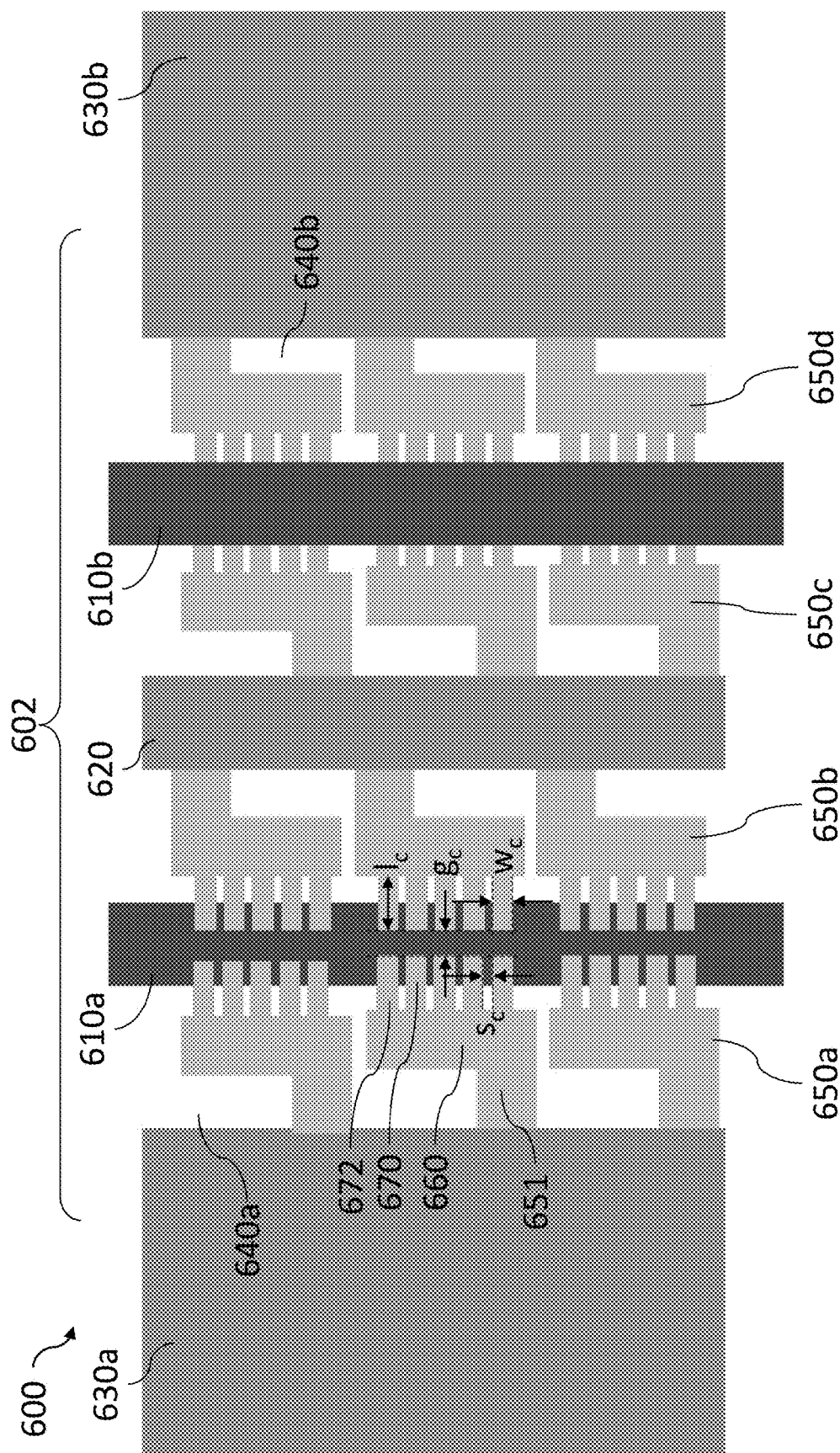
FIG. 7A shows an exemplary electro-optic modulator with hooks, fangs, and comb electrodes on the signal and ground conductors.

FIG. 7A shows an exemplary electro-optic modulator 600 with capacitive structures 650a, 650b, 650c, and 650d that include comb electrodes 670. As shown, the electro-optic modulator 600 may include a pair of optical waveguides 610a and 610b (collectively referred to herein as optical waveguide 610) and a microwave transmission line 602. The microwave transmission line 602 may include a signal conductor 620 and parallel ground conductors 630a and 630b defining slots 640a and 640b. Similar to the electro-optic modulator 300, the microwave transmission line 602 may include a capacitive structure 650a electrically coupled to the ground conductor 630a, a capacitive structure 650b electrically coupled to the signal conductor 620 and disposed in the slot 640a, a capacitive structure 650c electrically coupled to the signal conductor 620 and disposed in the slot 640b, and a capacitive structure 650d electrically coupled to the ground conductor 630b. The slots 640a and 640b are collective referred to herein as slot 640.

The capacitive structures 650a, 650b, 650c, and 650d (collectively referred to herein as capacitive structure 650) may include a periodic array of structural elements similar to the capacitive structure 350. As before, the capacitive structure 650 may include a fang 651 and a hook 660 forming a L-shaped hook-fang structure. The capacitive structure 650 may also include a comb electrode 670 with one or more teeth 672 extending from the hook 660. The comb electrode 670 provides yet another structural element to tune the capacitance of the microwave transmission line 602 and the electric field distribution without affecting the inductance microwave transmission line 602 and the signal insertion loss.

Figure 7B:
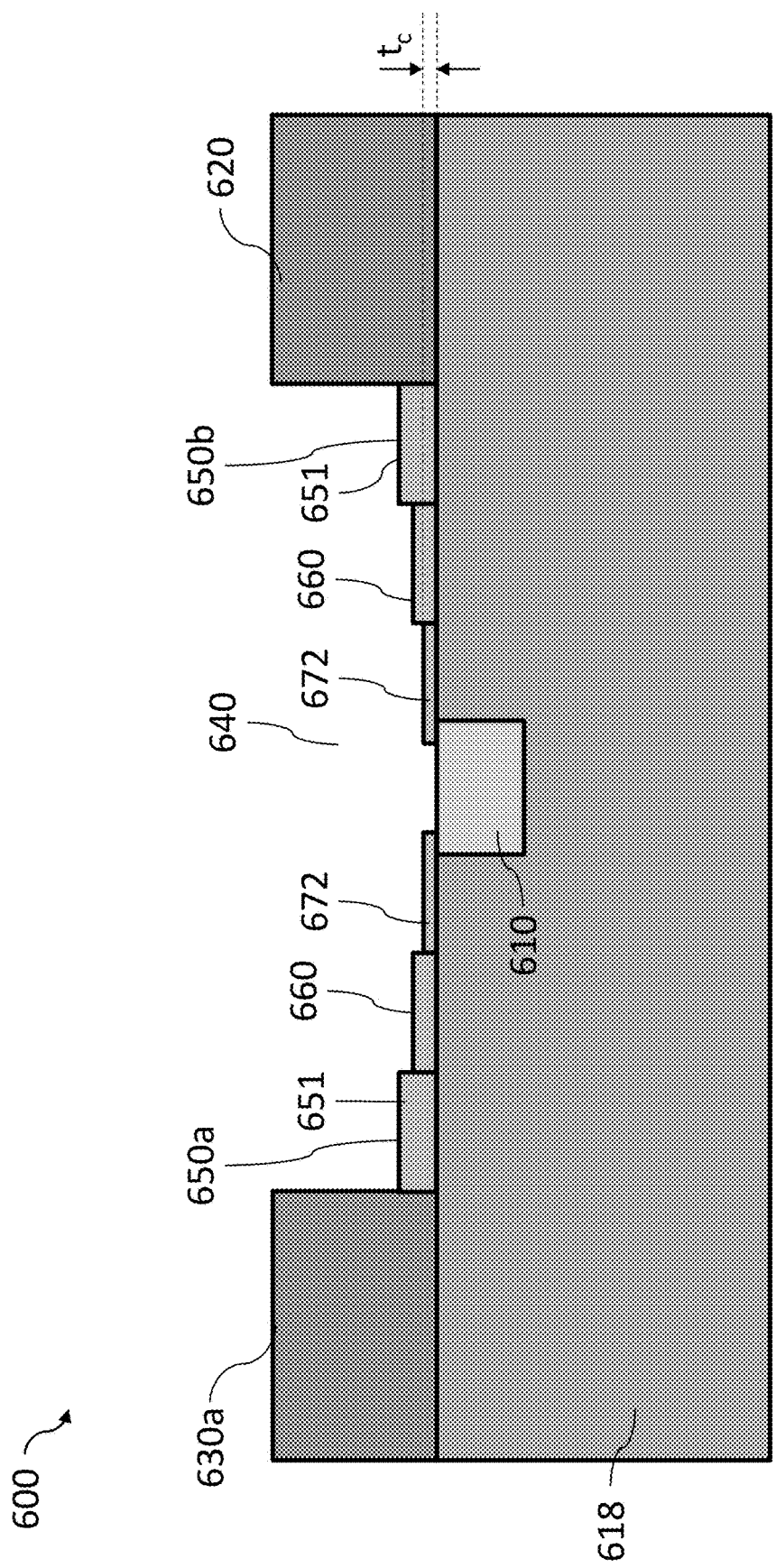
FIG. 7B shows a cross-sectional view of the electro-optic modulator of FIG. 7A.

Each tooth 673 of the comb electrode 670 may be an electrically conducting element that extends from the hook 660 and into the slot 640 towards the optical waveguide 610. As shown in FIGS. 7A and 7B, the comb electrode 670 may overlap with the optical waveguide 610 when the electro-optic modulator 600 is viewed normal to the plane of a substrate 618. The comb electrode 670 may thus provide multiple electrically conducting elements that are placed in closer proximity to the optical waveguide 610 to provide an even higher amplitude and more uniform electric field in the optical waveguide 610 compared to the hook-fang structure of the electro-optic modulator 300. A stronger electric field may further reduce the half-wave voltage, in the electro-optic modulator 600. Additionally, the comb electrode 670 may also tune the capacitance of the microwave transmission line 602 based on the gap ($g_c$) between the respective comb electrodes 670 of the capacitive structures 650a and 650b (or 650c and 650d).

For the electro-optic modulator 600, the dimensions of the signal conductor 620, the ground conductor 630, the slot 640, the fang 651, and the hook 660 may be similar to the electro-optic modulator 300 described above. Each tooth 672 of the comb electrode 670 may have a width ($w_c$) that ranges between about 50 nm and about 2 μm and a length ($l_c$) that ranges between about 1 μm and about 50 μm. The gap $g_c$ between respective comb electrodes 670 in the capacitive structures 650a and 650b may range between about 500 nm and about 30 μm.

The comb electrode 670 may further include two or more teeth 672 that are separated by a distance ($s_c$) that ranges between about 50 nm and about 2 μm. In some cases, the number of teeth 672 in the comb electrode 670 may depend, in part, on the width $w_c$, the distance $s_c$, and the length of the hook 660. For example, the comb electrode 670 may span the length of the hook 660, thus the number of teeth 672 may be based on the length of the hook 660 divided by the sum of the width $w_c$ and the distance sc.

Each tooth 672 may also have a thickness ($t_c$) that ranges between about 10 nm and about 300 nm. The thickness of the tooth 672 may be similar or different to the fang 651 and/or the hook 660. For example, FIG. 7B shows the tooth 672 may be thinner than the hook 660 and the hook 660 may be thinner than the fang 651.

CONCLUSION

All parameters, dimensions, materials, and configurations described herein are meant to be exemplary and the actual parameters, dimensions, materials, and/or configurations will depend upon the specific application or applications for which the inventive teachings is/are used. It is to be understood that the foregoing embodiments are presented primarily by way of example and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein.

In addition, any combination of two or more such features, systems, articles, materials, kits, and/or methods, if such features, systems, articles, materials, kits, and/or methods are not mutually inconsistent, is included within the inventive scope of the present disclosure. Other substitutions, modifications, changes, and omissions may be made in the design, operating conditions and arrangement of respective elements of the exemplary implementations without departing from the scope of the present disclosure. The use of a numerical range does not preclude equivalents that fall outside the range that fulfill the same function, in the same way, to produce the same result.

Also, various inventive concepts may be embodied as one or more methods, of which at least one example has been provided. The acts performed as part of the method may in some instances be ordered in different ways. Accordingly, in some inventive implementations, respective acts of a given method may be performed in an order different than specifically illustrated, which may include performing some acts simultaneously (even if such acts are shown as sequential acts in illustrative embodiments).

All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of" or "exactly one of." "Consisting essentially of" when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An electro-optic modulator comprising:
   an optical waveguide, formed in an electro-optic material, to guide an optical wave; and
   a microwave transmission line, disposed over the electro-optic material, to guide an electrical signal that modulates a refractive index of the electro-optic material, the microwave transmission line comprising:
      a ground conductor parallel to the optical waveguide and having a first thickness;
      a ground capacitive structure extending from the ground conductor toward the optical waveguide and having a second thickness less than the first thickness;
      a signal conductor parallel to the optical waveguide and the ground conductor and having a third thickness; and
      a signal capacitive structure extending from the signal conductor toward the optical waveguide and having a fourth thickness less than the third thickness.

2. The electro-optic modulator of claim 1, wherein the first thickness and the third thickness are each about 1 μm to about 10 μm and the second thickness and the fourth thickness are each about 10 nm to about 300 nm.

3. The electro-optic modulator of claim 1, wherein the ground capacitive structure comprises a first fang having a width parallel to an optical axis of the optical waveguide of about 2 μm to about 10 μm and a length perpendicular to the optical axis of the optical waveguide of about 4 μm to about 50 μm.

4. The electro-optic modulator of claim 3, wherein the ground capacitive structure comprises a second fang separated from the first fang by a distance parallel to the optical axis of the optical waveguide of about 2 μm to about 15 μm.

5. The electro-optic modulator of claim 3, wherein the ground capacitive structure comprises a first hook extending from the first fang and having a width perpendicular to the optical axis of the optical waveguide of about 50 nm to about 2 μm and a length parallel to the optical axis of the optical waveguide of about 10 μm to about 50 μm.

6. The electro-optic modulator of claim 5, wherein the first hook has a thickness ranging between about 10 nm to about 300 nm and the first fang has a thickness ranging between about 300 nm and about 2 μm.

7. The electro-optic modulator of claim 5, wherein the signal capacitive structure comprises a second hook and a second fang.

8. The electro-optic modulator of claim 1, wherein the ground capacitive structure is separated from the signal capacitive structure by a distance of about 2 μm to about 30 μm.

9. The electro-optic modulator of claim 1, wherein the ground conductor is separated from the signal conductor by a distance of about 5 μm to about 80 μm.

10. The electro-optic modulator of claim 1, wherein the ground capacitive structure and the signal capacitive structure have two-fold rotational symmetry about an axis normal to an optical axis of the optical waveguide.

11. An electro-optic modulator comprising:
    an optical waveguide, formed in an electro-optic material, to guide an optical wave; and
    a microwave transmission line, disposed over the electro-optic material, to guide an electrical signal that modulates a refractive index of the electro-optic material, the microwave transmission line comprising:
- a ground conductor oriented parallel to the optical waveguide;
- a signal conductor oriented parallel to the optical waveguide and the ground conductor, the signal conductor and the ground conductor defining a slot that overlaps the optical waveguide, the signal conductor and the ground conductor setting an inductance of the microwave transmission line; and
- a first capacitive structure, electrically coupled to one of the ground conductor and the signal conductor, to set a capacitance of the microwave transmission line independently from the inductance of the microwave transmission line, wherein the first capacitive structure comprises:
  - a fang extending from the one of the ground conductor and the signal conductor into the slot towards the optical waveguide; and
  - a hook extending from the fang into the slot towards the optical waveguide and oriented parallel to the optical waveguide to increase a uniformity of an electric field generated by the electrical signal.

12. The electro-optic modulator of claim 11, wherein the fang and the hook form at least one of a T-shaped structure or an L-shaped structure.

13. The electro-optic modulator of claim 11, wherein at least one of the fang or the hook is formed beneath the optical waveguide.

14. The electro-optic modulator of claim 11, further comprising:
- a second capacitive structure electrically coupled to the other one of the ground conductor and the signal conductor.

15. The electro-optic modulator of claim 14, wherein the first capacitive structure is offset with respect to the second capacitive structure along an optical axis of the optical waveguide.

16. The electro-optic modulator of claim 14, wherein the first capacitive structure and the second capacitive structure have two-fold rotational symmetry about an axis normal to an optical axis of the optical waveguide.

17. An electro-optic modulator comprising:
- an optical waveguide, formed in an electro-optic material, to guide an optical wave; and
- a microwave transmission line, disposed over the electro-optic material, to guide an electrical signal that modulates a refractive index of the optical waveguide, the microwave transmission line comprising:
  - at least one first structure that sets an inductance of the microwave transmission line; and
  - at least one second structure that sets a capacitance of the microwave transmission line independent of the inductance of the microwave transmission line, wherein the at least one second structure comprises a periodic array of fangs extending from the at least one first structure towards the optical waveguide, each fang in the periodic array of fangs having a corresponding hook extending from the fang to increase a uniformity of an electric field generated by the electrical signal.

18. The electro-optic modulator of claim 17, wherein the at least one first structure is thicker than the at least one second structure.

* * * * *